United States Patent
Powers et al.

(10) Patent No.: US 11,481,024 B2
(45) Date of Patent: Oct. 25, 2022

(54) SIX DEGREE OF FREEDOM TRACKING WITH SCALE RECOVERY AND OBSTACLE AVOIDANCE

(71) Applicant: Occipital, Inc., Boulder, CO (US)

(72) Inventors: Jeffrey Roger Powers, San Francisco, CA (US); Vikas Reddy, Boulder, CO (US); Yuping Lin, Boulder, CO (US)

(73) Assignee: XRPRO, LLC, Boulder, CO (US)

( * ) Notice: Subject to any disclaimer, the term of this patent is extended or adjusted under 35 U.S.C. 154(b) by 16 days.

(21) Appl. No.: 17/073,550

(22) Filed: Oct. 19, 2020

(65) Prior Publication Data
US 2021/0034144 A1     Feb. 4, 2021

Related U.S. Application Data

(62) Division of application No. 15/994,448, filed on May 31, 2018, now Pat. No. 10,809,795.
(60) Provisional application No. 62/512,779, filed on May 31, 2017, provisional application No. 62/516,183, filed on Jun. 7, 2017.

(51) Int. Cl.
| | | |
|---|---|---|
| G06T 15/00 | (2011.01) | |
| G06F 3/01 | (2006.01) | |
| G06T 7/13 | (2017.01) | |
| G06T 7/73 | (2017.01) | |
| G06T 7/50 | (2017.01) | |
| G06T 7/90 | (2017.01) | |
| G06T 19/00 | (2011.01) | |
| G06T 19/20 | (2011.01) | |

(Continued)

(52) U.S. Cl.
CPC ............ *G06F 3/011* (2013.01); *G06F 3/0346* (2013.01); *G06T 7/13* (2017.01); *G06T 7/181* (2017.01); *G06T 7/50* (2017.01); *G06T 7/73* (2017.01); *G06T 7/90* (2017.01); *G06T 19/006* (2013.01); *G06T 19/20* (2013.01); *G06T 2207/10024* (2013.01); *G06T 2219/2004* (2013.01)

(58) Field of Classification Search
CPC ... G06T 3/011; G06T 7/13; G06T 7/73; G06T 7/50; G06T 7/90; G06T 7/181; G06T 19/20; G06T 2219/2004; G06T 2207/10024; G06T 19/006; G06F 3/0346
USPC ........................................................ 345/418
See application file for complete search history.

(56) References Cited

U.S. PATENT DOCUMENTS

| | | | |
|---|---|---|---|
| 9,511,711 B2 * | 12/2016 | Petrillo | .................... B60R 1/00 |
| 9,613,420 B2 | 4/2017 | Tamaazousti et al. | |

(Continued)

OTHER PUBLICATIONS

Marder-Eppstein, E., Berger, E., Foote, T., Gerkey, B. and Konolige, K., 2010, May. The office marathon: Robust navigation in an indoor office environment. In 2010 IEEE international conference on robotics and automation (pp. 300-307). IEEE.*

(Continued)

*Primary Examiner* — Phu K Nguyen
(74) *Attorney, Agent, or Firm* — Lee & Hayes, P.C.

(57) ABSTRACT

A virtual reality or mixed reality system configured to preform object detection using a monocular camera. The system configured to make the user aware of the detected objects by showing edges or lines of the object within a virtual scene. Thus, the user the user is able to avoid injury or collision while immersed in the virtual scene. In some cases, the system may also detect and correct for drift in the six degree of freedom pose of the user using corrections based on the current motion of the users.

20 Claims, 14 Drawing Sheets

(51) Int. Cl.
*G06T 7/181* (2017.01)
*G06F 3/0346* (2013.01)

(56) References Cited

U.S. PATENT DOCUMENTS

| | | | |
|---|---|---|---|
| 9,824,450 | B2 | 11/2017 | Martini |
| 9,891,049 | B2 | 2/2018 | Brown |
| 10,269,148 | B2 | 4/2019 | Jones |
| 10,388,041 | B2 | 8/2019 | Birchfield et al. |
| 10,521,952 | B2 | 12/2019 | Ackerson et al. |
| 2014/0139669 | A1* | 5/2014 | Petrillo ............... B60R 1/00 348/148 |
| 2018/0348854 | A1 | 12/2018 | Powers et al. |
| 2021/0213877 | A1* | 7/2021 | Petrillo ............... G01C 21/3697 |

OTHER PUBLICATIONS

Koschan, Andreas, and Mongi Abidi. "Detection and classification of edges in color images." IEEE Signal Processing Magazine 22, No. 1 (2005): 64-73.*

Ekström, Johan. "Obstacle avoidance for platforms in three-dimensional environments." KTH Royal Instite of Technology, Master Thesis, (2016).*

Qasim, M.S., 2016. Autonomous collision avoidance for a teleoperated UAV based on a super-ellipsoidal potential function (Doctoral dissertation, University of Denver).*

Wang X, Zhao X, Gnawali O, Shi W. Enhancing independence for people with low vision to use daily panel-interface machines. In6th International Conference on Mobile Computing, Applications and Services Nov. 6, 2014 (pp. 155-159). IEEE.*

Grewe L, Overell W. Road following for blindBike: an assistive bike navigation system for low vision persons. InSignal Processing, Sensor/Information Fusion, and Target Recognition XXVI May 2, 2017 (vol. 10200, p. 1020011). International Society for Optics and Photonics.*

Rao H, Fu WT. Combining schematic and augmented reality representations in a remote spatial assistance system. InIEEE ISMAR 2013 Workshop on Collaboration in Merging Realities 2013.*

Chatzopoulos D, Bermejo C, Huang Z, Hui P. Mobile augmented reality survey: From where we are to where we go. Ieee Access. Apr. 26, 2017;5:6917-50.*

Alismail, Hatem, "Direct Pose Estimation and Refinement", Carnegie Mellon Institute, Aug. 2016, 235 pages.

Briskin, Gil "Estimating Pose and Motion Using Bundle Adjustment and Digital Elevation Model Constraints", Master Thesis, Israel Institute of Technology, May 2013, 78 pages.

Mur-Artal, R. et al. "ORB-SLAM: A Versatile and Accurate Monocular SLAM System", IEEE Transactions on Robotics, Aug. 24, 2015, 17 pages.

Mur-Artal, et al, "Probabilistic Semi-Dense Mapping from Highly Accurate Feature-Based Monocular SLAM", InRobotics: Science and Systems, vol. 2015, Jul. 13, 2015, 10 pages.

Non Final Office Action dated Jan. 27, 2020 for U.S. Appl. No. 15/994,448 "Six Degree of Freedom Tracking With Scale Recovery and Obstacle Avoidance" Powers, 10 pages.

Sibley, Gabe, "Relative Bundle Adjustment", Department of Engineering Science, Oxford University, Technological Report Jan. 27, 2009, 26 pages.

Strasdat, Hauke "Local Accuracy and Global Consistency for Efficient Visual SLAM", Doctoral Dissertation, Department of Computing, Imperial College London, 213 pages.

* cited by examiner

Compute the tangent of the rotation component of
`smooth_from_best_t1` (`smooth_from_best_tangent`) and `pose_t_from_t1`
(`t_from_t1_tangent`)

Project `smooth_from_best_t1` onto `t_from_t1_tangent`
(`smooth_projection`). Compute the length of `smooth_projection`, then scale it
such that it is no more than 10% of the length of the magnitude of
`t_from_t1_tangent` (`smooth_projection_scaled`)

Add `smooth_projection_scaled` to `t_from_t1_tangent` and
exponentiate to reform a rotation.

//Perform the same projection, scaling, and adding operation using
the translation components of `smooth_from_best_t1` and
`pose_t_from_t1`. Combine the resulting rotation and translation
components, then apply to `pose_t_original` to obtain the final pose.
```

// Function to blend each motion component inline OCVector3d blendMotionVectors (const OCVector3d& a,
const OCVector3d& b, double maxFraction)

{
        // Extend/shorten `b` by the amount of the projection of `a` onto `b`,
capped // at `maxFraction` of `b`'s magnitude.

double projFraction = clamp<double> (b.dot (a) / b.squaredNorm (),
-maxFraction, maxFraction);
return b * (1. + projFraction);
}

OCVector3d smooth_from_best_tangent = logMap (OCQuaterniond
(smooth_from_best_t1.rotation ())); OCVector3d t_from_t1_tangent =
logMap (OCQuaterniond (t_from_t1.rotation ()));

output.worldFromColor = lastWorldFromColor * OCIsometry3d
(expMap (blendMotionVectors (smooth_from_best_tangent,
t_from_t1_tangent, 0.1)),
blendMotionVectors (relativeLiveFromBestLiveColor.translation (),
t_from_t1.translation (), 0.1));
```

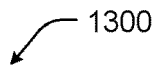

//Each transformation listed above these methods is a member of the Lie Algebra, SE3, "Special Euclidean Group in 3-Dimensions". The first step of this method is to compute the logarithm maps of `smooth_from_best_t1` and `pose_t_from_t1` to convert them to the SE3 tangent space. These 6-dimensional tangent space representations are local parameterizations of the SE3 manifold Compute `smooth_correction` as `smooth_from_best_t1` scaled to no more than 5% of the magnitude of `pose_t_from_t1_tangent`. Add `smooth_correction` to `pose_t_from_t1_tangent` and take the exponential map of the result to compute the `pose_t_from_t1_output` SE3. Apply `pose_t_from_t1_output` to `pose_t_original` to obtain the final pose for the user.

```
    inline VectorT blendMotionVectors (const VectorT& a, const VectorT& b, double maxFraction)

{
    return b + a * std::min (b.norm () * maxFraction / a.norm (), 1.);
}

OCVector3d smooth_from_best_tangent = logMap ( OCQuaterniond (smooth_from_best.rotation ()));

OCVector3d pose_t_from_t1_tangent = logMap (OCQuaterniond (pose_t_from_t1.rotation ()));

OCVector6d smooth_from_best_se3, pose_t_from_t1_se3;

smooth_from_best_se3.head3 () = smooth_from_best_tangent;

smooth_from_best_se3.tail3 () = smooth_from_best.translation ();

pose_t_from_t1_se3.head3 () = pose_t_from_t1_tangent;

pose_t_from_t1_se3.tail3 () = pose_t_from_t1.translation ();

OCVector6d blended = blendMotionVectors(smooth_from_best_se3, pose_t_from_t1_se3, 0.05);

output.worldFromColor = lastWorldFromColor * OCIsometry3d (expMap (blended.head3()), blended.tail3());
```

//This method hides the corrective motion by only applying a small fraction of the user's overall motion.

FIG. 14

SIX DEGREE OF FREEDOM TRACKING WITH SCALE RECOVERY AND OBSTACLE AVOIDANCE

CROSS-REFERENCE TO RELATED APPLICATION(S)

This application is a divisional of and claims priority to U.S. patent application Ser. No. 15/994,448, filed on May 31, 2018 and entitled "SIX DEGREE OF FREEDOM TRACKING WITH SCALE RECOVERY AND OBSTACLE AVOIDANCE," issuing as U.S. Pat. No. 10,809,795 on Oct. 20, 2020, which claims priority to U.S. Provisional Application Nos. 62/512,779 filed on May 31, 2017 and entitled "6 DEGREE OF FREEDOM TRACKING AND OBSTACLE AVOIDANCE FOR AR AND VR APPLICATIONS USING COMPUTER VISION AND LOW COST SENSING" and 62/516,183 filed on Jun. 7, 2017 and entitled "6 DEGREE OF FREEDOM TRACKING WITH SCALE RECOVERY AND OBSTACLE AVOIDANCE FOR AR AND VR APPLICATIONS USING COMPUTER VISION AND LOW COST SENSING," which are incorporated herein by reference in their entirety.

BACKGROUND

The presence of three-dimensional (3D) imaging and virtual reality systems in today's world is becoming more and more common. However, accidents and injuries received users engaged in virtual scene's is increasing due to a lack of real world object detection, awareness, and avoidance as well as user position within the real world. Conventional systems, typically instruct users to clear an area or create an object free real world environment to avoid a need for object detection and avoidance by the user. Unfortunately, large open and level spaces are difficult to find or hard to maintain particularly when an environment includes pets and children.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 13 is an example pseudocode associated with determining an adjusting a pose of a user within a virtual scene according to some implementations.

FIG. 14 is another example pseudocode associated with determining an adjusting a pose of a user within a virtual scene according to some implementations.

DETAILED DESCRIPTION

Figure 1:
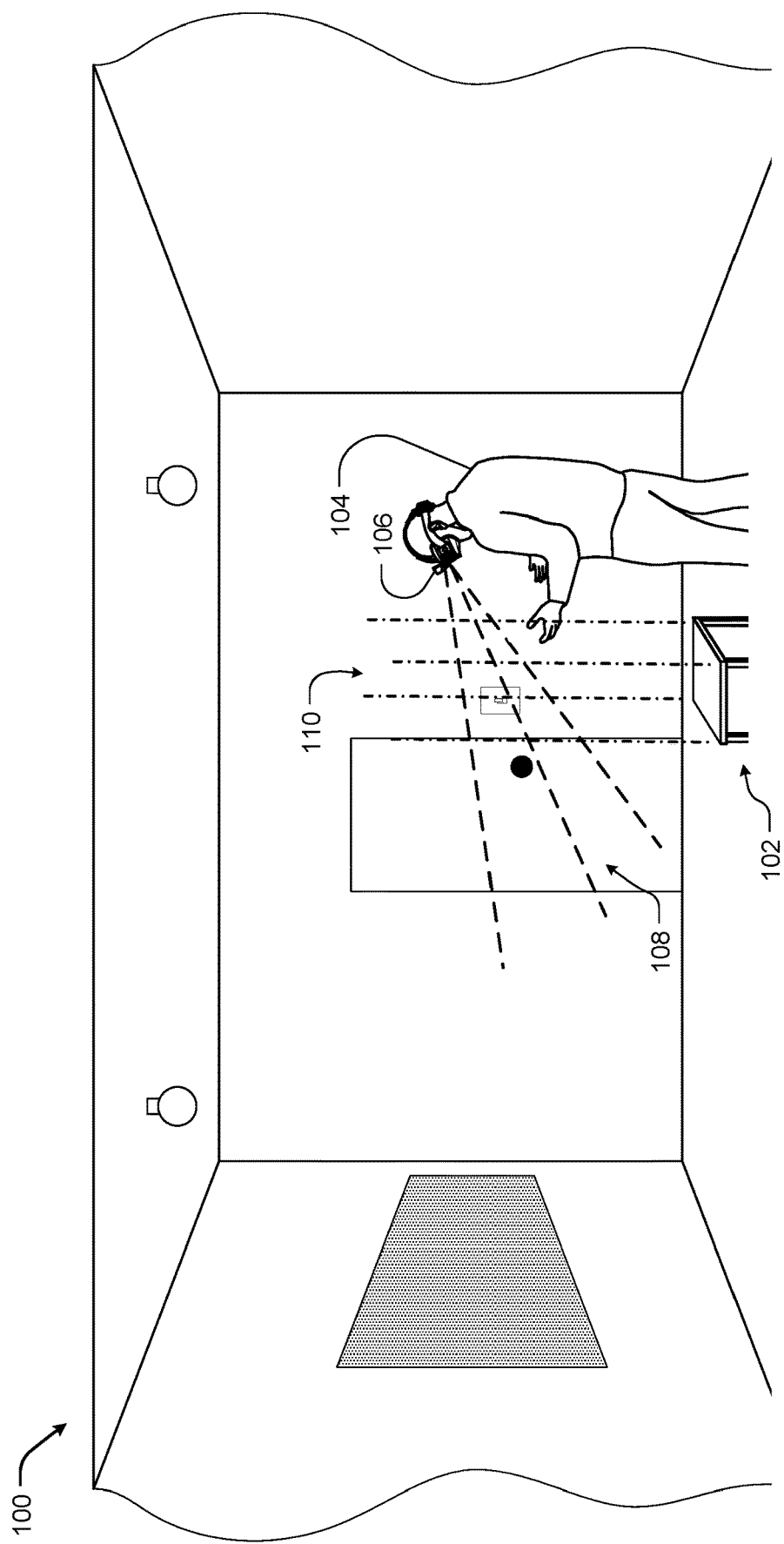
FIG. 1 illustrates an example physical environment including a table and a user of a virtual reality or mixed reality system interacting engaged in a virtual scene according to some implementations.

This disclosure includes techniques and implementations for physical object detection, physical object avoidance, and physical object awareness for a user engaged in a virtual scene or environment. For example, a virtual reality or mixed reality system may be configured to allow a user to be immersed within and interact with a virtual scene. However, while the user views and interacts with the virtual scene, the user is still moving within a physical space or environment. In some cases, the user may become injured due to collisions with real objects in the physical world.

To avoid collisions, conventional systems may require the user to clear an open level physical space in which to experience the virtual scene. However, multiple issues and limitations arise when the user is constrained to a predefined area. For instance, the user may overlook small objects on the ground, such as toys or books, some objects may be hard to move, such as furniture or devices requiring cabling, and/or objects may enter the cleared space while the user is engaged in the virtual scene (e.g., pets or children). Thus, merely clearing an open space fails to prevent collision and injuries in some cases. Further, by limiting the user to a predefined space, the system is constrained as to the scope of the virtual environment or scene that may be experienced. Additionally, the constrains of the predefined area limits in the types of applications and services that may be provided via system.

The system discussed herein is configured to detect and make the user aware of real world physical objects that may be in the user's environment, while still allowing the user to experience the virtual scene. For example, the system may detect objects using various object detection techniques and then display lines, such as an outline of the real world physical object, to the user within the virtual scene. Thus, the user may view the virtual scene and when an object in the field of view is within a threshold distance (e.g., 10 feet, 8 feet, 5 feet, 4 feet, 3 feet, 1 foot, 4 meters, 3 meters, etc.), the system may cause lines associated with the object to appear within the virtual scene being viewed by the user. For example, the object may appear as dots, lines (solid or broken), outlines, partially transparent features, etc.

In the example above, the objects that are displayed are within the view or field of vision of the user. Thus, if the object is outside of the area being observed by the user, the object may still pose a risk of collision by and injury to the user. In these cases, the system may perform object detection of a wider area than the field of view or may be aware of the object due to past mapping of the physical environment. For instance, a coffee table may be below a field of view of the user (e.g., the user is looking up at a dragon within the virtual scene, while the coffee table that poses the real-world risk is below a height of the user's knee). In these instances, the system may project lines extending from the table into the field of view. For example, the system may show rays, corner lines, partially transparent walls, or other indicator of the location and size of the object that is near the user but outside the field of view. In some cases, the brightness, intensity, or solidity of the object may increase as the user moves closer to the physical object (e.g., the coffee table). In one case, the brightness, intensity, or solidity of the projection or object lines may be based on a ratio of the distance of the user to the object.

In one particular example, the color of the projection, lines, or other indicator may change as the user moves closer or is more likely to collide with the object. For instance, the lines may change from green to yellow to red as the user moves closer to the object. In another instance, the system may determine from the user's current motion or predicted motion (e.g., past history of movement and information known about the virtual scene), that an object is high risk, medium risk, or low risk to the user. In this case, the colors, brightness, intensity, or solidity of the object may change based on the detected level of risk.

In some cases, the system may rely on a 3D model or 3D map of the physical environment to determine if physical objects pose a threat to the user. However, often the contents of the physical environment may change (e.g., toys or books are left out on the floor or a child or pet runs through the physical environment). Thus, the system discussed herein may perform object detection of a wider area than the field of view or may be aware of the object due to past mapping of the physical environment and update the 3D model or 3D map in substantially real-time, such as by implementing a simultaneous locations and mapping (SLAM) technique in addition to, in some instances, a predictive analysis (e.g., to determine a probably location of the child or a trajectory of the child compared with a trajectory of the user). In this case, the system may also display to the user, the trajectory so that the user may anticipate the child and stop or pause the virtual scene.

In one specific example, the system discussed herein includes a technique and method for detecting objects using a single camera and an inertial measurement unit (IMU). For instance, some virtual reality or mixed reality systems rely on the use of a processors, storage, displays, and cameras associated with external devices. In these instances, the external devices may only have a single camera from which to perform object detecting and user tracking (e.g., six degree of freedom pose tracking). In this example, the system may be able to within substantially real-time generate a sparse map or model of the physical environment with sufficient information that when the sparse model is projected into the virtual scene the user is able to recognize the objects.

In the above technique, the system may first generate a sparse map of points of interest using feature points. The points of interest are then used as input to a visual-inertial SLAM that tracks the position or six degree of freedom (6DOF) pose of the single camera as the camera moves through the physical environment. The system then uses an obstacle-awareness system (that may operate substantially simultaneously with the visual-inertial SLAM) to detect line segments from the image data. The line segments are then matched together using one or more descriptor to form lines. In one case, the descriptor may be a color variations, gradients, or contrasts between each side of the lines, as lines within a physical environment typically have a dominate color on each side. For example, a line may be generated as an outline of a door based on a contrast or gradient between a brown door or trim and a white wall.

Next the system, places the lines in the physical environment by using pairs of images captured by the camera and the 6DOF pose of the camera. For example, each line may be parameterized using the two 3D points which represent the line's endpoints. As the placed line is observed in multiple images, the position of the lines in the physical environment may then be improved as each image is captured using a non-linear least square and a cost. The cost may be determined by identifying a point-to-line distance between the reprojection of the endpoints and the corresponding line detected in each newly captured image.

In some examples, the sparse point of inters map may be used by the SLAM system to determine the 6DOF pose of the camera for use in placing the lines. In this example, the lines are then projected into the virtual scene as discussed above. In other examples, both the sparse points of interest map and the lines may be projected in combination to provide additional context to the physical environment the user viewing the virtual scene. Thus, it should be understood, that the system discussed herein may operate with reduced hardware (e.g., fewer image devices or cameras) using fewer processing resources with improved throughput when compared with conventional virtual or mixed reality systems due to the sparse nature of the lines and points of interest.

In some situation, detecting objects via line segments may fail to detect all types of real-world physical objects that the user may encounter. For example, if the coffee table discussed above was round, the system may not detect any line segments that may be merged into lines for projection into the virtual scene. Thus, in some implementations, the system discussed herein may perform edgelet detection in order to detect the physical objects in addition to or in lieu of the line segment detection discussed above.

In this example, the system may again use a sparse point of interest map and a SLAM technique to determine the 6DOF pose of the camera. However, in this example, the system may estimate or detect edgelets opposed to line segments. As discussed herein, an edgelet is a small patch of an image with high image gradient. In some specific examples, the edgelet may also be an image patch with high contrast. Next, the system may merge or connect nearby (e.g., less than a pixel distance threshold) or adjacent to each other and connected by a continuous gradient (e.g. a similar gradient or less than a gradient threshold from each other) to generate joined edgelets. In some cases, the system may compute a reprojection error for each edgelet in a contour and reject edgelets that have a reprojection error over a threshold. The joined edgelets are then utilized to estimate surface contours and the surface contours may be used to form surfaces, for instance, by applying a Poisson reconstruction technique. Thus, the system may detect physical objects that do not include straight lines or edges. Once detected, the system may again cause lines or other indicators of the object to be projected into the virtual scene based on distance or threat to a user.

In addition to detecting objects, the edgelets may be used to identify contours that may be used as part of a tracking loop associated with the SLAM technique implemented by the system. For example, once the edgelets are grown into contours, the system may apply a best-fit plane to the contours to define the contours as a surface. For example, the edgelets may be points or segments of the edge of an object, the contours may be the edge of the object derived from the edgelets, and the plane may form the surface of the object. The system may also perturb the contour or the best-fit plane to confirm that the contour or best-fit plane is well localized (e.g., the system is confident over a threshold value in the location of the plane in the environment) in the 3D model or map of the physical environment. for instance, the system may apply a Monte Carlo Uncertainty Estimation to the contours or best-fit plane. For contours that are well localized, the contours may be used as part of the tracking loop of the SLAM system.

In some implementations, either or both of the line segment detection or the edgelet detection may be used as an input for dense reconstruction of featureless planar surfaces. For instance, conveniently virtual reality or mixed realty systems fail to properly resolve or detect large homogeneous surfaces (such as walls, ceilings, and floors), as the surfaces do not contain enough texture to resolve using conventional technique of stereo matching between two cameras. The system discussed herein, may utilize either or both of the line segment detection and the edgelet detection to grow straight or curved lines using a single camera. The system may then utilize the lines to hypothesis the location and existence of planar surfaces. For instance, the system may utilize a superpixel extraction technique to generate regions per input image or frame. If there are two or more lines crossing a region, the system may hypothesize a planar surface using plane fitting techniques. Over multiple frames or image, the system may collect a set of hypothesized planar surface estimates around the same region and the system may reject hypothesized planar surfaces that are outliers (e.g., a hypothesized planar surface outside of a threshold deviation from the hypothesized planar surfaces or an averaged hypothesized planar surface). The hypothesized planar surfaces may then be utilized as a strong constraint (e.g., the system is confident or has determined at above a threshold level of accuracy that the planar surface is in the physical environment) on the geometry of a physical environment.

In another example, the system may utilize the hypothesized planar surfaces as part of a dense reconstruction technique formulated as an optimization problem that minimizes a cost function. A cost function could, in this example, be constructed such that the cost is high when points and lines don't fall on the surface and has low cost when the lines are close to the surface (e.g., where distance from the surface could be accounted for in the cost).

Another issue with the conventional systems, is that drift may occur with respect to tracking the pose of the user within the virtual scene, the scale of the virtual scene may differ from the physical environment, or the height of the user may be misaligned. Thus, in some cases, due to a failure to properly position the user within the virtual scene, the system may render accessible virtual environment that is outside of the predefined space again resulting in collision or injury to the user.

Correcting for drift that is accrued over time during use of the virtual reality or mixed reality system may be performed as part of a periodic bundle adjustment or correction. The use of a bundle adjustment allows for more accurate position tacking of the user with respect to the physical environment and improves the future tacking and refines the 3D model or map of the physical environment over time. However, performing a bundle adjustment may cause a large jump in position or pose of the user within the virtual environment. This sudden change in perspective is often disjointing to the user and can cause some users to become nauseous.

The system discussed herein, includes processes to reduce the large jump in user pose caused by the bundle adjustment. For instance, in one implementation, the system may determine a desired 6DOF pose of the user as part of a bundle adjustment. The system may then determine a transformation estimate between the desired 6DOF pose and the current 6DOF pose of the user to generate a difference in each of the six degrees of freedom. In some cases, the transformation estimate may include a translation estimate and a rotation estimate. Once the transformation estimate is calculated, when the user moves, the system may determine a direction of the motion along each of the six degrees of freedom, e.g., the motion in the X direction (left/right), Y direction (up/down), Z direction (forward/backward), as well as the pitch, yaw, and roll of the motion. If the motion of the user within one of the six degrees of freedom matches one of the six degree of freedom associated with the transformation estimate, the system may speed up or slow down the movement along the corresponding degree of freedom to gradually move the user into the desired 6DOF pose. In some cases, the incases the magnitude of the speed up or slowdown may be no more than 10% of the difference between the desired 6DOF pose and the current 6DOF pose. Further, it should be understood, that the system increases the speed or decreased the speed of movement within the virtual scene based on a sign or direction of the difference between the corresponding six degree of freedom. The system may continue to make adjustments until the current 6DOF pose matches the desired 6DOF pose.

In another example, the system may correct for accumulated drift in smaller segments but without regard to the degree of the user motions. So once again, the system may determine a desired 6DOF pose of the user as part of a bundle adjustment. The system may then determine a correction vector based on difference between the current 6DOF pose of the user and the desired 6DOF pose. While the user is in motion, the system may determine an overall magnitude associated with the motion. The system may then calculate a correction motion that is no more than 5% of the magnitude of the user's current motion. The system may then apply the correction motion in the direction of the correction vector to the user's motion while the user is moving. The system may continue to make adjustments each time the user is in motion until the current 6DOF pose matches the desired 6DOF pose.

The system may also be configured to establish a height of the user engaged in the virtual scene. For example, to assist with some object (e.g., fans, lights or other overhangs) awareness and avoidance the system may establish the height of the user. Additionally, having an accurate estimate of the user's height assists with rendering the virtual scene in a believable manner to the user. For example, when the viewing height of the virtual scene is off compared with a normal viewing height of the user, the user loses a degree of immersion in the virtual. Thus, having an accurate measure of the user's height allows for a more realistic and impressive virtual experience. The system, discussed herein, may determine surfaces or planes using one more of the processes discussed above. The system may then process each of the potential or hypothesis ground planes to determine which is beneath the 6DOF pose of the user. The height of the user may then be estimated using the 6DOF pose of the user and the position or height of the ground plane. Alternatively, the system may label each surface as a candidate or hypothesis ground planes if the surface is perpendicular to gravity determined from the IMU data. The system may then perform a 1D search on the candidates for the true ground plane by searching along the gravity vector and evaluating which candidate or hypothesis ground plane is the most likely the correct one at a given position.

In some implementations, the system may also be configured to determine a scale associated with the physical environment to assist with object awareness and avoidance as well as to correctly scale the virtual scene with respect to the user. For instance, while a monocular SLAM technique using only a single camera allows for tracking motion of the user and an estimation of certain scene geometry, the monocular SLAM system lacks the real-world or physical scale of that motion or geometry (e.g. the user could be moving the camera within a physical house or a doll house replica that is 1/100 the size). Other variables that are also difficult to obtain by a single camera are gyro and accelerometer biases and gravity.

The system discussed herein is based on relating motion detected by a visual tracker to the motion obtained by integration of the IMU signals over short time periods. These relations may be used to formulate a least squares optimization which can be solved for the above-mentioned variables (scale, gyro biases, accelerometer biases, and gravity).

While running a visual tracker using any number of SLAM technique, the system may select and store a number of keyframe poses from the visual tracker (the keyframe poses could be bundle adjusted to increase the accuracy of their poses), while also recording data from the IMU, with both the keyframe poses and IMU having accurate timestamps in order to relate them. Then, the system can first fit the gyro biases based on computing angular velocity across the sequence and fitting bias in each axis of the gyro (X,Y,Z) (b) then, fixing the gyro biases based on (a), compute a scale, accelerometer biases, and gravity that fits the vision tracked poses and IMU data best using a least squares optimization.

The system may also precisely control the time spacing of the poses used for computing the relations by saving intermediate poses between keyframes instead of relying on keyframes poses only. Equal time spacing ensures each equation in the least squares problem has equal weight in the solution, and allows the solution to be recomputed even if keyframes are not added during tracking. Also, controlling the time spacing allows precisely trading off how noise in the tracked poses and noise in the IMU measurements contributes to the solution.

The system may also use of a Monte Carlo approach to estimate uncertainty in the solved parameters (scale, accelerometer biases, gravity). Specifically, this can be done by running the optimization described in above, where in each run, the visually tracked poses have some random Gaussian-like noise added to them with a standard deviation equal to the expected noise in the visually tracked poses. A standard deviation can be computed for each estimated parameter (scale, accelerometer biases, gravity) across all these runs and this standard deviation can be a measure of how much uncertainty there is in each parameter. This estimate of parameter uncertainty can be used along with the condition of the problem to determine when the solution is reliable.

In certain situations, when attempting to run a linear least squares optimization, the regression dilution property of linear least squares can cause the scale parameter to be underestimated when there is noise in the tracked poses, specifically, if the tracked poses are used for computing independent variables in the least squares problem. The underestimation may grow as the noise in the tracked poses increases. The system discussed herein uses two different methods to reduce the underestimation. First, the system may de-noise the tracked poses before sending the tracked poses to the estimation system in order to reduce noise. Second, the tracked poses may employ an error-in-variables model which accounts for noise in the independent variables of the least squares problem and does not result in biased estimates of the regression parameters when such noise is present. For example, the system may implement a total least squares (TLS) technique.

FIG. 1 illustrates an example physical environment 100 including a table 102 and a user 104 of a virtual reality or mixed reality system 106 interacting engaged in a virtual scene according to some implementations. In the current example, the user 104 may be viewing a virtual scene while moving or traversing the physical environment 100. In the current example, the user 104 is on a path to impact or collide with the table 102. However, the user 104 is viewing a virtual scene with a field of view, generally indicated by 108. Thus, the user 106 may be unaware of their surroundings and an impact with the table 102 is likely. However, the system 106 may include one or more image devices (such as various types of cameras) to capture data related to the physical environment 100. The system 106 may, thus, detect the table 102 within the image data and determine that the table 102 is less than a predefined distance from the user 104 or that the table 102 is a threat to the user 104 based on the user 104 movement patterns, the content of the virtual scene, and historical data known about the user 104.

If the system 106 determines that the user 104 is likely to impact the table 104, the system 106 may project lines 110 associated with the table 102 into the field of view 108 of the user 104 within the virtual scene displayed by the system 106. In other examples, it should be understood that the system 106 may project lines associated with the object (such as the table 102) when the object itself is in the field of view 108 or other types of indicators to make the user 104 aware of objects within the physical environment 100 and avoid potential injuries.

In one particular example, the system 106 may detect lines associated with the table 102 in substantially real-time using a single camera. For instance, the system 106 may first generate a points of interest map using feature points. The map may be used as input to a visual-inertial SLAM implemented by the system 106 to tracks the 6DOF pose of the user 104 as the user 104 moves through the physical environment 100. The system 106 then uses an obstacle-awareness system (that may operate substantially simultaneously with the visual-inertial SLAM) to detect line segments from the image data captured by the camera. The line segments are then matched together using one or more descriptor to form lines. In one case, the descriptor may be based on color variations, gradients, or contrasts between each side of the lines, as lines within a physical environment 100 typically have a dominate color on each side. For example, a line may be generated along the edge of the table 102 as the floor color will create a gradient with a color of the table 102.

Next the system 106, places the lines in the physical environment 100 by using pairs of images captured by the camera and the 6DOF pose of the user 104. For example, each line may be parameterized using the two 3D points which represent the line's endpoints. As the placed line is observed in multiple images, the position of the lines in the physical environment 100 may then be improved as each image is captured using a non-linear least square and a cost. The cost may be determined by identifying a point-to-line distance between the reprojection of the endpoints and the corresponding line detected in each newly captured image.

In some examples, the sparse point of inters map may be used by the SLAM system to determine the 6DOF pose of the user 104 for use in placing the lines. In this example, the lines 110 of the table 102 are then projected into the virtual scene. In other examples, both the sparse points of interest map and the lines may be projected in combination to provide additional context to the physical environment 100 the user 104 viewing the virtual scene.

Figure 2:
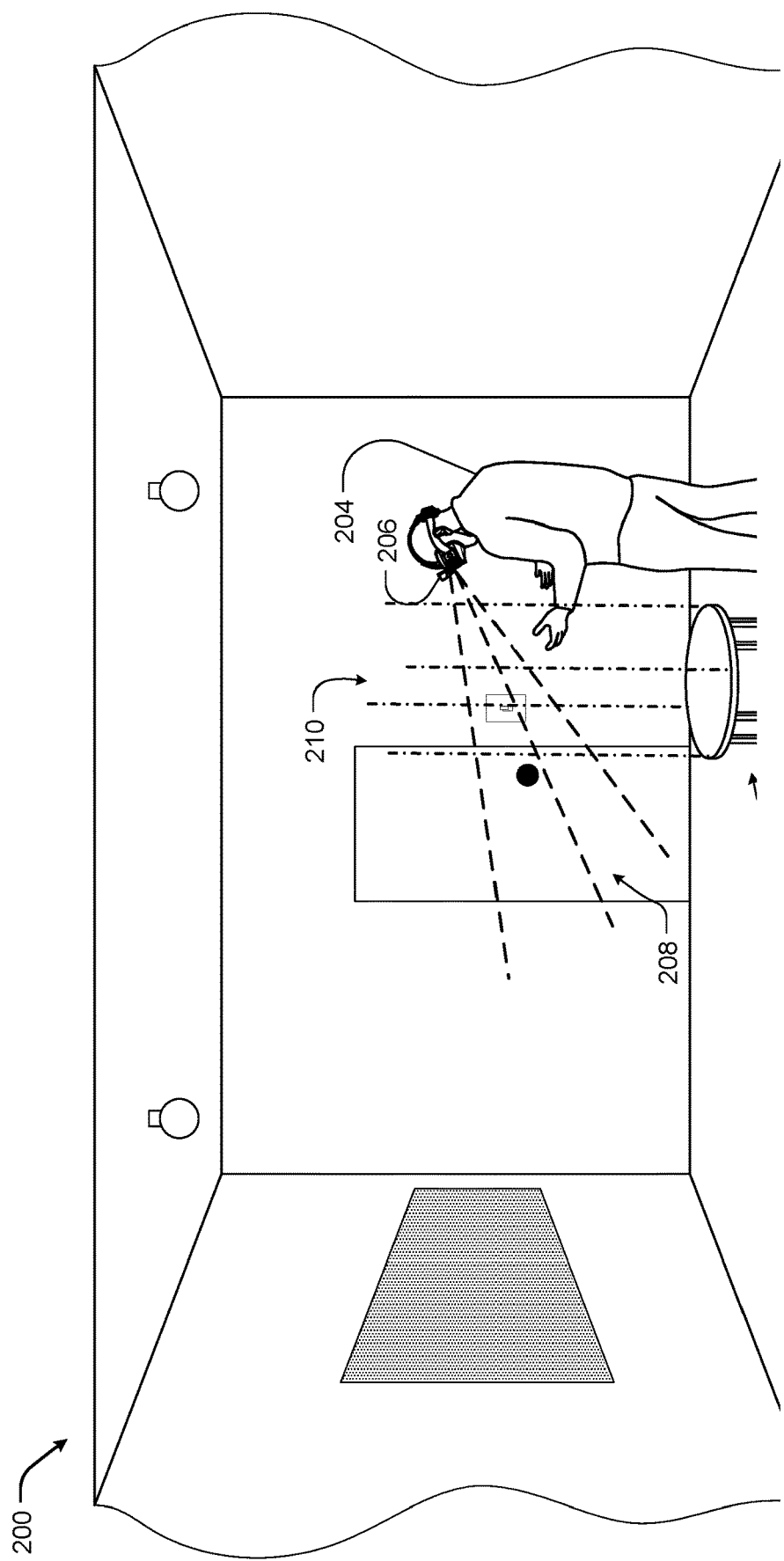
FIG. 2 illustrates another example physical environment including a table and a user of a virtual reality or mixed reality system interacting engaged in a virtual scene according to some implementations.

FIG. 2 illustrates another example physical environment 200 including a table 202 and a user 204 of a virtual reality or mixed reality system 206 interacting engaged in a virtual scene according to some implementations. In the present example, the table 202 is still in the path of the user 204 and may result in a collision or injury. Again, the system 206 projects lines 210 into the field of view 208 of the user 204 engaged in the virtual scene. Thus, the user 204 becomes aware of and is able to avoid the table 204. However, in this example, the table 202 is round. In some case, additional object detection modules may be used to detect the round or curved objects.

For example, the system 106 may also perform edgelet detection in order to detect the round or curved objects in the physical environment 200. Similar to the line detection of FIG. 1, in this example, the system 206 may again use a sparse point of interest map and a SLAM technique to determine the 6DOF pose of the user 204. However, the system 206 may estimate or detect edgelets opposed to line segments. As discussed above, an edgelet is a small patch of an image with high image gradient. Next, the system 206 may merge or connect nearby (e.g., less than a pixel distance threshold) or adjacent to each other and connected by a continuous gradient (e.g. a similar gradient or less than a gradient threshold from each other) to generate joined edgelets. In some cases, the system 206 may compute a reprojection error for each edgelet in a contour and reject edgelets that have a reprojection error over a threshold. The joined edgelets are then utilized to estimate surface contours and the surface contours may be used to form surfaces, for instance, by applying a Poisson reconstruction technique. Thus, the system 206 may detect physical objects that do not include straight lines or edges. Once detected, the system 206 may again cause lines or other indicators of the object to be projected into the virtual scene based on distance or threat to a user 204.

In addition to detecting objects, the edgelets may be used to identify contours that may be used as part of a tracking loop associated with the SLAM technique implemented by the system 206. For example, once the edgelets are grown into contours, the system 206 may apply a best-fit plane to the contours to define the contours as a surface. The system 206 may also perturb the contour or the best-fit plane to confirm that the contour or best-fit plane is well localized in the 3D model or map of the physical environment 200. For instance, the system 206 may apply a Monte Carlo Uncertainty Estimation to the contours or bets-fit plane.

It should be understood that while the systems 106 and 206 of FIGS. 1 and 2 are labeled independently that the system 106 and 206 may be the same. For example, the systems 106 and 206 may implement either or both of the line segment detection or the edgelet detection discussed herein. Thus, in some implementations, the line segment detection and/or the edgelet detection processes may be used as an input for dense reconstruction of featureless planar surfaces by the systems 106 and 206. For instance, conveniently virtual reality or mixed realty systems fail to properly resolve or detect large homogeneous surfaces (such as walls, ceilings, and floors), as the surfaces do not contain enough texture to resolve using conventional technique of stereo matching between two cameras. The systems 106 and/or 206 discussed herein, may utilize either or both of the line segment detection and the edgelet detection to grow straight or curved lines using a single camera. The systems 106 and/or 206 may then utilize the lines to hypothesis the location and existence of planar surfaces. For instance, the systems 106 and/or 206 may utilize a superpixel extraction technique to generate regions per input image or frame. If there are two or more lines crossing a region, the systems 106 and/or 206 may hypothesize a planar surface using plane fitting techniques. Over multiple frames or image, the systems 106 and/or 206 may collect a set of hypothesized planar surface estimates around the same region and the systems 106 and/or 206 may reject hypothesized planar surfaces that are outliers (e.g., a hypothesized planar surface outside of a threshold deviation from the hypothesized planar surfaces or an averaged hypothesized planar surface). The hypothesized planar surfaces may then be utilized as a strong constraint on the geometry of a physical environment.

In some examples, the systems 106 and/or 206 may utilize the hypothesized planar surfaces as part of a dense reconstruction technique formulated as an optimization problem that minimizes some cost function. In this example, the dense reconstruction technique the systems 106 and/or 206 may assign high costs when the lines don't lie on the surface and low costs when the lines are close to (e.g., less than a threshold distance from) or on the surface.

Figure 3:
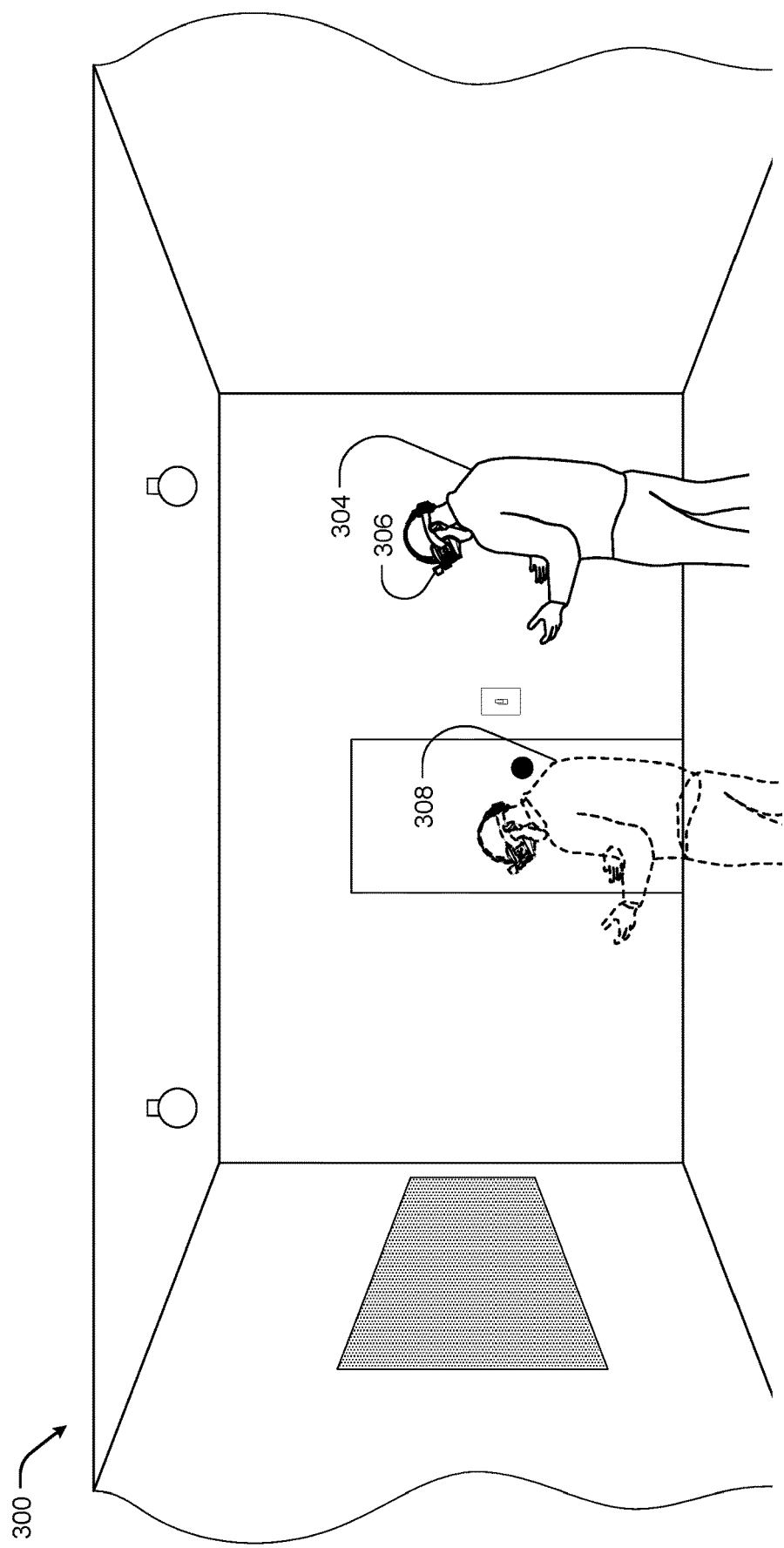
FIG. 3 illustrates another example physical environment including a user of a virtual reality or mixed reality system interacting engaged in a virtual scene according to some implementations.

FIG. 3 illustrates another example physical environment 300 including a user 304 of a virtual reality or mixed reality system 306 interacting engaged in a virtual scene according to some implementations. As discussed above, one issue with the conventional virtual reality systems, is that drift may occur with respect to tracking the pose of the user 304 within the virtual scene, the scale of the virtual scene may differ from the physical environment 300, or the height of the user 304 may be misaligned. Thus, in some cases, due to a failure to properly position the user 304 within the virtual scene, the system 306 may render accessible virtual environment that is outside of the predefined space again resulting in collision or injury to the user 304.

For instance, in the illustrated example, the user 304 is illustrated in solid lines, however, the system 306 may believe that the user 304 is at the position 308, generally indicated by the dotted outline of the user. Correcting for difference between the user 304 and the position 308 may be performed by the system 306 as part of a periodic bundle adjustment or correction. However, as discussed above, performing a bundle adjustment may cause a large jump in position or pose of the user 304 as the user 304 is moved within the virtual environment from the position of 308 (e.g, the 6DOF pose represented by 308) to the actual 6DOF pose of the user 304. This sudden change in perspective is often disjointing to the user and can cause some users to become nauseous.

In the illustrated example, the system 306 may reduce the size or severity of the jump in 6DOF pose experienced virtually by the user 304. For instance, the system 306 may first determine a desired 6DOF pose of the user 304 as part of a bundle adjustment. The system 306 may then determine a transformation estimate between the desired 6DOF pose (e.g., the actual 6DOF pose of the user 304 (and the current 6DOF pose of the user (e.g., position 308) to generate a difference in each of the six degrees of freedom. In some cases, the transformation estimate may include a translation estimate and a rotation estimate.

Once the transformation estimate is calculated, when the user 304 moves, the system 306 may determine a direction of motion along each of the six degrees of freedom, e.g., the motion in the X direction (left/right), Y direction (up/down), Z direction (forward/backward), as well as the pitch, yaw, and roll of the motion. If the motion of the user 304 is within one of the six degrees of freedom matches one of the six degree of freedom associated with the transformation estimate, the system 306 may speed up or slow down the movement along the corresponding degree of freedom to gradually move the user into the desired 6DOF pose at position 308. In some cases, the incases the magnitude of the speed up or slowdown may be no more than 10% of the difference between the desired 6DOF pose at position 308 and the current 6DOF pose of the user 304. Further, it should be understood, that the system 306 increases the speed or decreased the speed of movement within the virtual scene based on a sign or direction of the difference between the corresponding six degree of freedom. The system 306 may continue to make adjustments until the current 6DOF pose matches the desired 6DOF pose.

In another example, the system 306 may correct for accumulated drift in smaller segments but without regard to the degree of the motion of the user 304. So once again, the system 306 may determine a desired 6DOF pose of the user 304 as part of a bundle adjustment. The system 306 may then determine a correction vector based on difference between the current 6DOF pose of the user at position 308 and the desired 6DOF pose at the user 306. While the user 304 is in motion, the system 306 may determine an overall magnitude associated with the motion. The system 306 may then calculate a correction motion that is no more than 5% of the magnitude of the current motion of the user 304. The system 306 may then apply the correction motion in the direction of the correction vector to the motion of the user 304 while the user is moving. The system 306 may continue to make adjustments each time the user 304 is in motion until the current 6DOF pose matches the desired 6DOF pose.

The system may also be configured to establish or correct a height of the user 304 engaged in the virtual scene. For example, when the viewing height of the virtual scene is off compared with a normal viewing height of the user 304, the user 304 becomes more aware of the oddness of the virtual scene. Thus, having an accurate measure of the height of the user 304 allows for a more realistic and impressive virtual experience.

In one example, the system 306 may detect large surfaces or planes that are substantially perpendicular to a gravity vector available from an IMU integrated in the system 306 as potential or hypothesis ground planes. The system 306 may then process each of the potential or hypothesis ground planes to determine which is beneath the 6DOF pose of the user 304. The height of the user 304 may then be estimated using the 6DOF pose of the user 304 and the position or height of the ground plane. Alternatively, the system 306 may label each surface as a candidate or hypothesis ground planes if the surface is perpendicular to gravity determined from the IMU data collected by the system 306. The system 306 may then preform a 1D search on the candidates for the true ground plane.

Again, it should be understood, that the system 306 may be the same as the systems 106 and 206 of FIGS. 1 and 2 and that the systems 106-306 may implement the processes discussed herein, such as the processes of FIGS. 4-9 below.

FIGS. 4-9 are flow diagrams illustrating example processes associated with preventing collision between a user of a virtual reality or mixed reality system and an object in the physical environment according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The process may be implemented on any of the system discussed herein, such as the system of FIGS. 1-3 and 11. Further, in some cases, the processes of FIGS. 4-9 may be used in combination or steps from one process may be used as part of another process.

Figure 4:
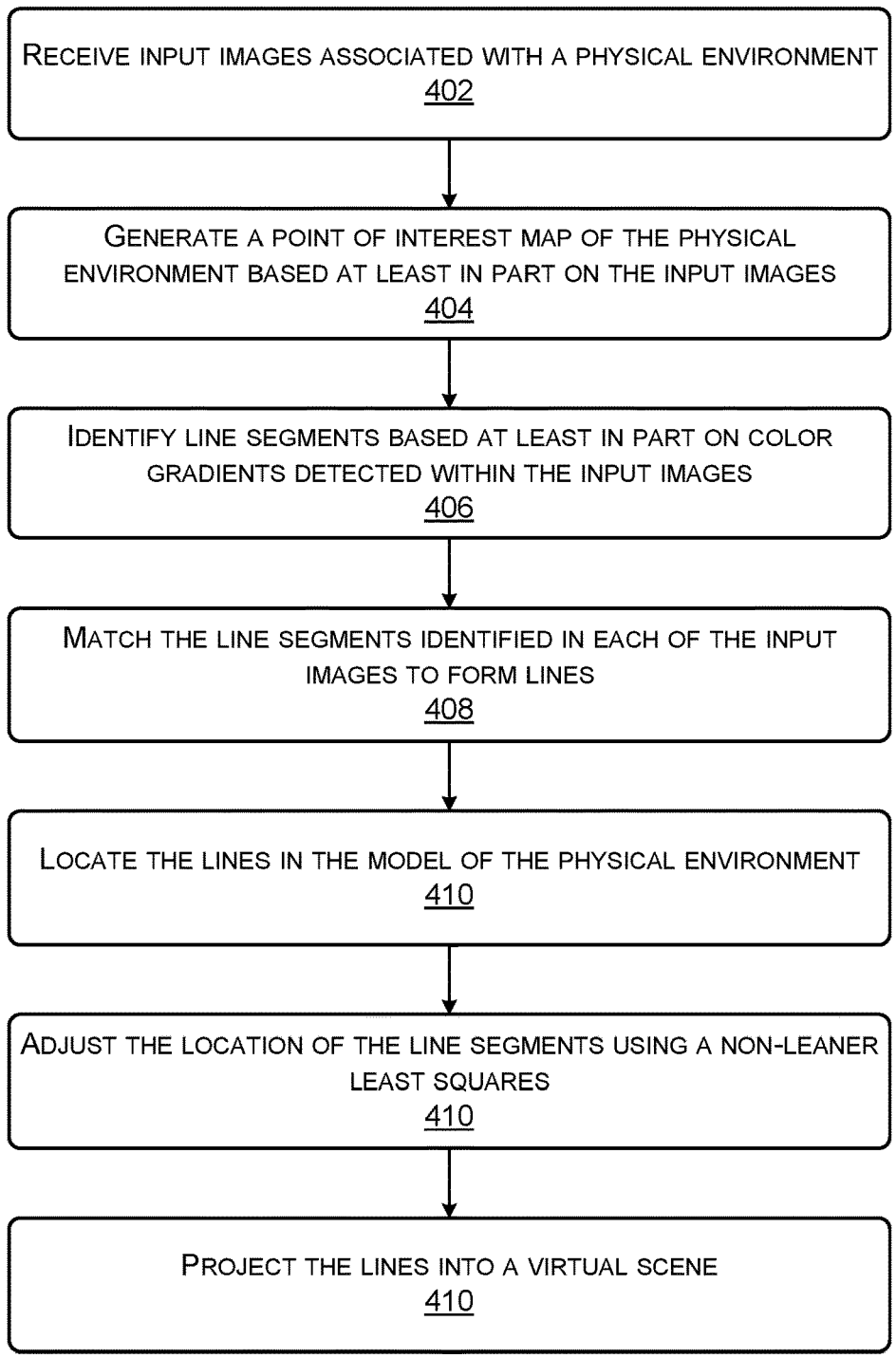
FIG. 4 illustrates an example flow diagram showing a process for adjusting a pose of a user within a virtual scene according to some implementations.

FIG. 4 illustrates an example flow diagram showing a process 400 for adjusting a pose (e.g., a 6DOF pose) of a user within a virtual scene according to some implementations. In the current example, a user may be viewing a virtual scene while moving or traversing the physical environment via a virtual realty or mixed realty system. In some cases, physical objects may be in a path of or nearby the user and may pose a risk of injury. In this example, the system may be configured to detect the physical objects in order to make the user aware of the objects and, thus, capable of avoiding the objects.

At 402, the system may receive input images associated with the physical environment. for example, the system may be configured to utilize a single camera or image device to capture the input images. In other cases, multiple number or types of image devices may be used. In some instances, the cameras or image devices may be incorporated into or coupled to the system. For example, the system may include a wide-angle camera, an infrared camera, and a color camera. In other cases, the cameras or image system may be adjacent too or nearby the user and the system.

At 404, the system may generate a points of interest map based at least in part on the input images. For instance, the points of interest map may be associated with a visual-inertial SLAM that tracks the 6DOF pose of the user as the user moves through the physical environment.

At 406, the system may identify line segments based at least in part on color gradients detected within the input images. For instance, an edge of an object is likely to cause a color gradient between the object itself and a background (such as a wall, ceiling, or floor).

At 408, the system may match the line segments identified in each of the input images. For instance, the system may match the line segments together using one or more descriptor to form lines. In one case, the descriptor may be a color variations, gradients, or contrasts between each side of the lines.

At 410, the system may locate the lines in the model of the physical environment. For instance, the system may first parameterize the lines using the two 3D points which represent the line's endpoints. The system may then place the lines using pairs of images captured by the camera, the endpoints of each line, and the 6DOF pose of the user 104. In some examples, the sparse point of inters map may be used by the SLAM system to determine the 6DOF pose of the user for use in placing the lines.

At 412, the system may adjust the location of the liens using a non-leaner least squares technique. For instance, as the placed lines are observed in multiple images, the position of the lines in the physical environment 100 may then be improved using a non-linear least square and a cost. The cost may be determined by identifying a point-to-line distance between the reprojection of the endpoints and the corresponding line detected in each newly captured image.

At 414, the system may project the lines into the virtual scene. For example, the system may show rays, corner lines, partially transparent walls, or other indicator of the location and size of the object within the virtual scene. in some cases, the projection may become more visible, flash, or otherwise draw more attention from the user as the user moves closer to the physical object.

Figure 5:
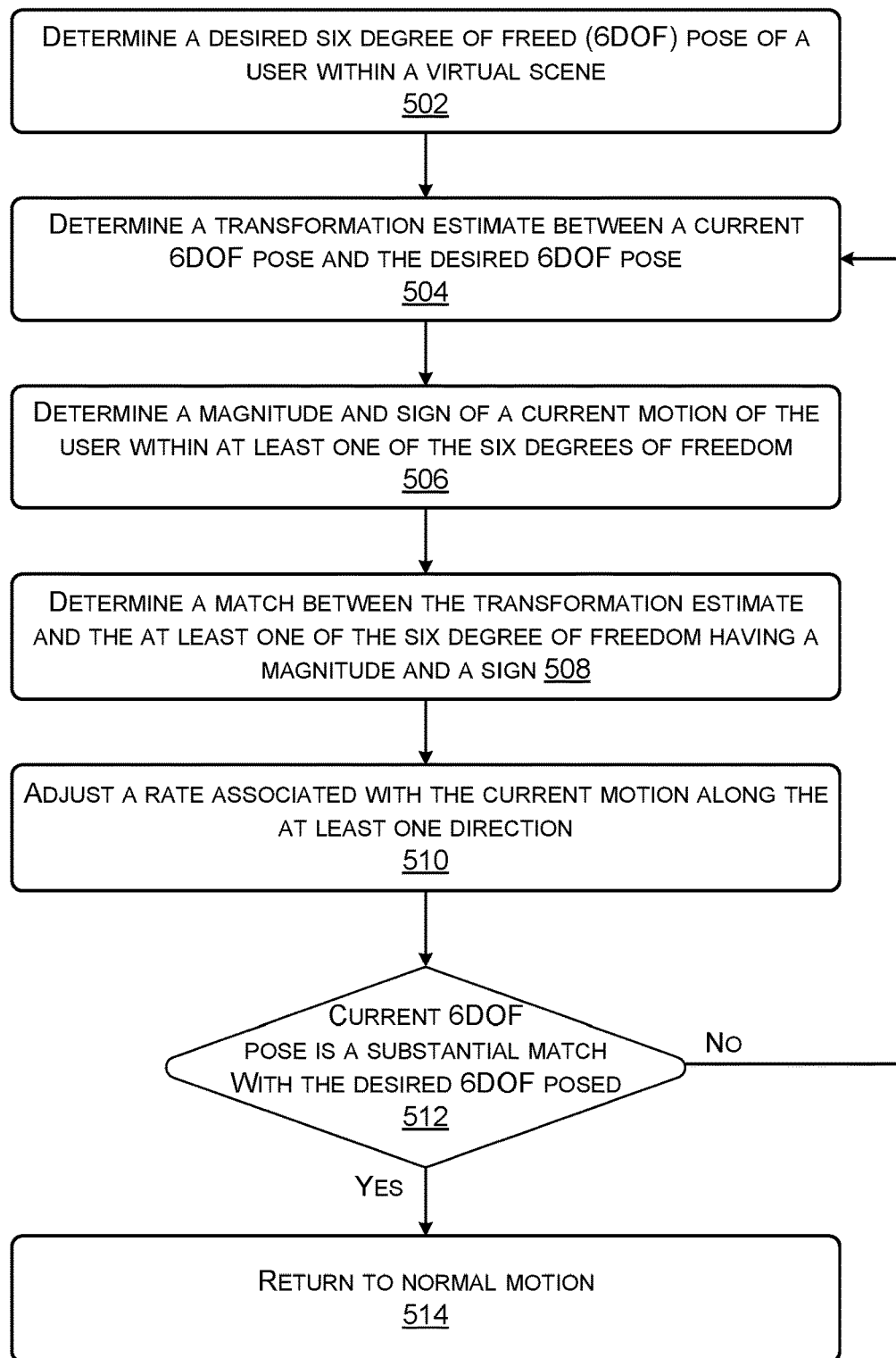
FIG. 5 illustrates an example flow diagram showing a process for providing physical object detection and awareness to a user engaged in a virtual reality scene according to some implementations.

FIG. 5 illustrates an example flow diagram showing a process 500 for providing physical object detection and awareness to a user engaged in a virtual reality scene according to some implementations. As discussed above, one issue with the conventional virtual reality systems is that drift may occur with respect to tracking the pose of the user within the virtual scene and correcting for drift may be accomplished by the system periodically performing a bundle adjustment or correction. However, as discussed above, performing a bundle adjustment may cause a large jump in position or pose of the user as the user is moved within the virtual environment. The process 500 below provides one technique for adjusting the 6DOF pose of the user to the desired 6DOF pose indicated as a result of the bundle adjustment.

At 502, the system may determine a desired 6DOF pose of a user within the virtual scene. For instance, as discussed above, the system may perform periodic bundle adjustments or corrections.

At 504, the system may determine a transformation estimate between the desired 6DOF pose and the current 6DOF pose of the user to generate a difference in each of the six degrees of freedom. In some cases, the transformation estimate may include a translation estimate and a rotation estimate.

At 506, the system may determine a magnitude and a sign of the current motion of the user within at least one of the six degree of freedom. For example, the system may determine the magnitude and the sign of the motion with respect to each of the X direction (left/right), the Y direction (up/down), the Z direction (forward/backward), the pitch, the yaw, and the roll. In some cases, the magnitude and the sign are determined individually for each of the degrees of freedom.

At 508, the system may determine if there is a match between the transformation estimate and at least one of the six degree of freedom having a magnitude and a sign. For example, if the displacement between the 6DOF current pose and the 6DOF desired pose aligns with one or more of the six degree of freedom in which the user is moving there is a match.

At 510, the system a rate associated with the current motion along the at least one direction. For example, the system my increase the magnitude or decrease the rate of change or the magnitude of the motion along any matching six degree of freedom. In some cases, the incase or decrease in the magnitude of the motion may be no more than 10% of the difference between the desired 6DOF pose and the current 6DOF pose to reduce the effect on the user. Further, it should be understood, that the system 306 increases the speed or decreased the rate of movement within the virtual scene based on a sign or direction of the difference between the corresponding six degree of freedom. For instance, if the motion is in the opposite direction of the difference in pose (e.g., a negative sign), the system may reduce the rate of the motion along the corresponding degree of freedom.

At 512, the system may determine if the current 6DOF pose is a substantial match with the desired 6DOF pose. If not the process 500 returns to 504 and the system makes another adjustment to the current 6DOF pose. However, if the poses are a substantial match, the process 500 proceeds to 514. At 514, the system may cause the motion within the virtual scene to return to normal.

Figure 6:
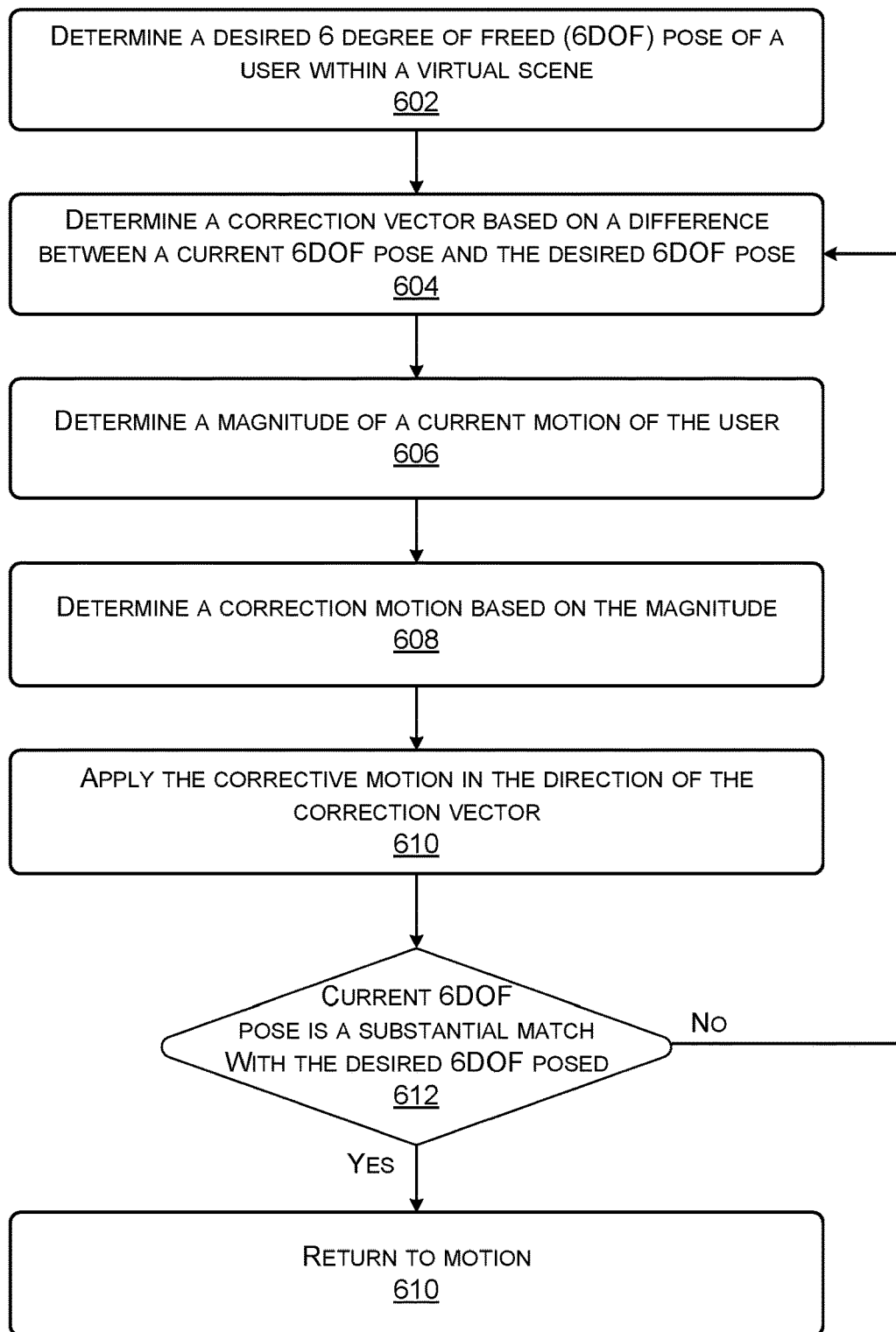
FIG. 6 illustrates another example flow diagram showing a process for providing physical object detection and awareness to a user engaged in a virtual reality scene according to some implementations.

FIG. 6 illustrates another example flow diagram showing a process 600 for providing physical object detection and awareness to a user engaged in a virtual reality scene according to some implementations. As discussed above, with respect to FIG. 5 one issue with the conventional virtual reality systems is that drift may occur with respect to tracking the pose of the user within the virtual scene and correcting for drift may be accomplished by the system periodically performing a bundle adjustment or correction. The process 600 below provides another technique for adjusting the 6DOF pose of the user to the desired 6DOF pose indicated as a result of the bundle adjustment.

At 602, the system may determine a desired 6DOF pose of a user within the virtual scene. For instance, as discussed above, the system may perform periodic bundle adjustments or corrections.

At 604, the system may determine a correction vector based on difference between the current 6DOF pose of the user and the desired 6DOF pose. For example, the system may determine a transformation estimate between the desired 6DOF pose and the current 6DOF pose. In some cases, the system may determine a translation estimate and a rotation estimate between the current 6DOF pose of the user and the desired 6DOF pose.

At 606, the system may determine a magnitude of a current motion of the user. In another example, the system may determine a rate or speed of the motion. For instance, the system may determine the magnitude or the rate of the motion based on data or 6DOF pose data collected At 608, the system may determine a correction motion based on the magnitude. Alternatively, the system may determine a correction motion based on the rate or speed. For example, the system may calculate a correction motion that is no more than 5% of the magnitude of the current motion of the user. In this example, the magnitude or speed of the motion is considered but the direction of the motion or the degree of freedom associated with the motion may be ignored.

At 610, the system may apply the correction motion in the direction of the correction vector to the motion while the user is moving. For example, the system may increase increases or decrease the magnitude of motion or rate of the motion along a direction associated with the correction vector, as the correction motion is less than 5% of the total motion the perception by the user of the correction motion is minimal.

At 612, the system may determine if the current 6DOF pose is a substantial match with the desired 6DOF pose. If not the process 600 returns to 604 and the system makes another adjustment to the current 6DOF pose. However, if the poses are a substantial match, the process 600 proceeds to 614. At 614, the system may cause the motion within the virtual scene to return to normal.

Figure 7:
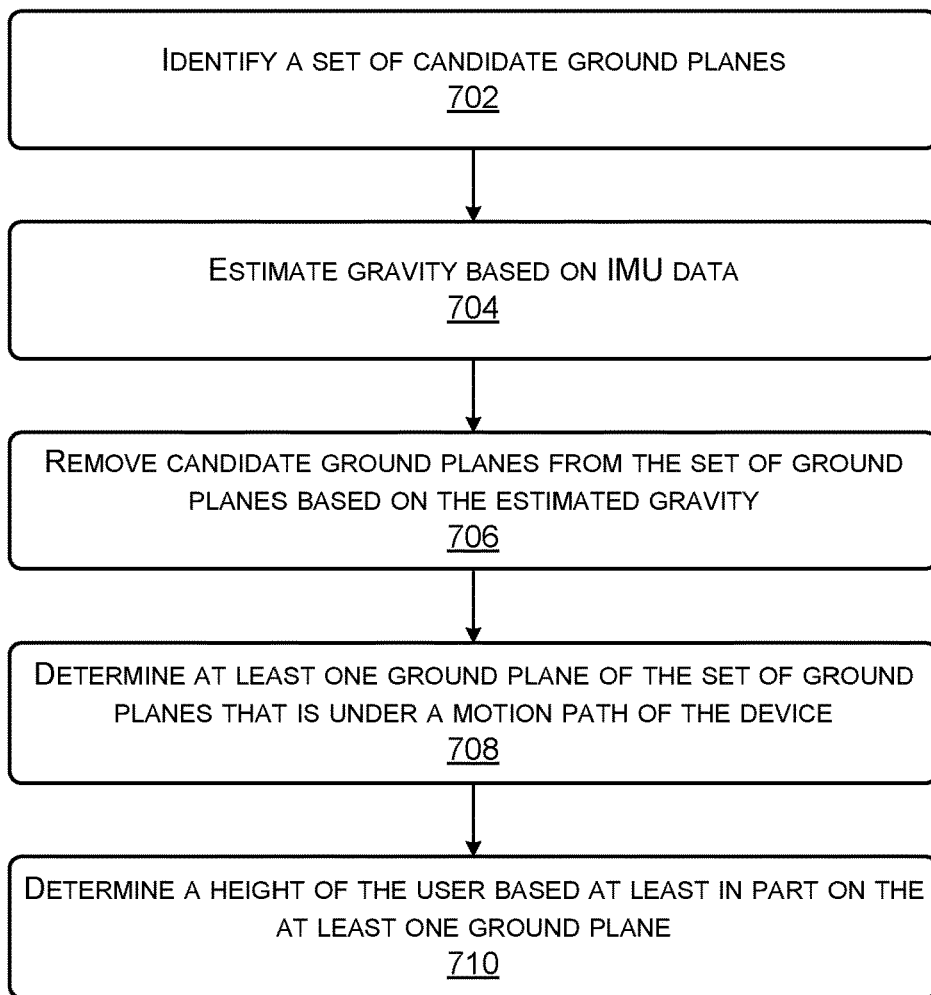
FIG. 7 illustrates an example flow diagram showing a process for determining a height of a user within a virtual scene according to some implementations.

FIG. 7 illustrates an example flow diagram showing a process for determining a height of a user within a virtual scene according to some implementations. As discussed above, the system may also be configured to establish or correct a height of the user engaged in the virtual scene. For example, when the viewing height of the virtual scene is off compared with a normal viewing height of the user, the user becomes more aware of the oddness of the virtual scene. Thus, having an accurate measure of the height of the user allows for a more realistic and impressive virtual experience.

At 702, the system may identify a set of candidate ground planes. For example, the system may detect large surfaces or planes that are substantially perpendicular to motion of the user or utilize gravity data available from an IMU integrated in the system as potential or hypothesis ground planes.

At 704, the system may estimate gravity based on the IMU data. For instance, the system may include an IMU that provides acceleration data, rotational data, and/or directional data. The system may utilize the IMU data, such as the acceleration to estimate gravity as discussed above.

At 706, the system may remove candidate ground planes from the set of ground planes based on the estimated gravity. For example, planes that are substantially parallel to the direction of gravity may be removed. Alternatively, the system may label each surface as a potential or hypothesis ground planes if the surface is perpendicular to gravity determined from the IMU data collected by the system.

At 708, the system may determine at least one ground plane form the set of remaining ground planes. For example, the system may process each of the potential or hypothesis ground planes to determine which is beneath the 6DOF pose of the user.

At 710, the system may determine a height of the user based at least in part on the at least one ground plane. 306. The system 306 may then preform a 1D search for the true ground plane.

Figure 8:
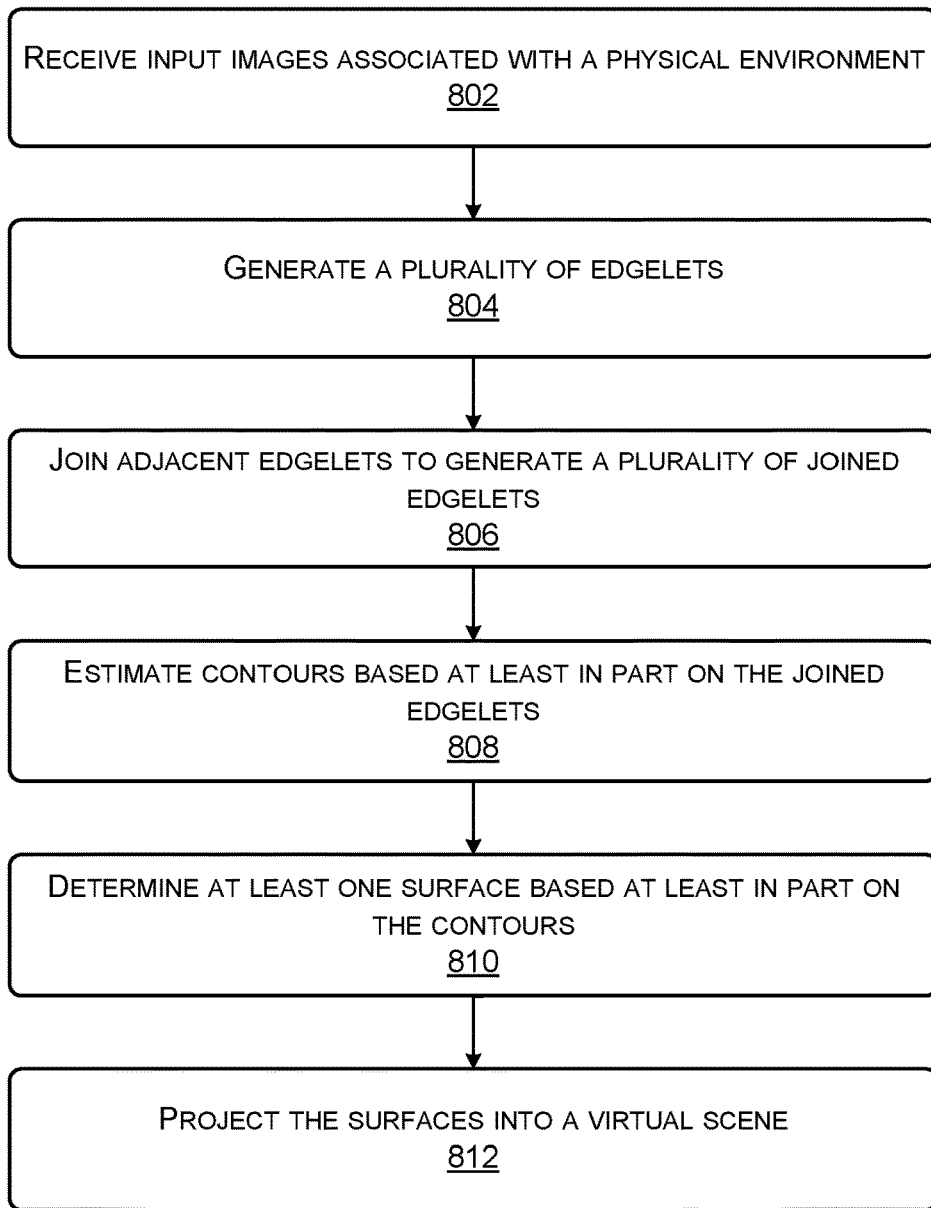
FIG. 8 illustrates another example flow diagram showing a process for providing physical object detection and awareness to a user engaged in a virtual reality scene according to some implementations.

FIG. 8 illustrates another example flow diagram showing a process 800 for providing physical object detection and awareness to a user engaged in a virtual reality scene according to some implementations. In the current example, the system may utilize the process 800 for the detection and awareness of objects such as circular tables that lack or only have scares line segments.

At 802, the system may receive input images associated with the physical environment. For example, the system may be configured to utilize a single camera or image device to capture the input images. In other cases, multiple number or types of image devices may be used. In some instances, the cameras or image devices may be incorporated into or coupled to the system. For example, the system may include a wide-angle camera, an infrared camera, and a color camera. In other cases, the cameras or image system may be adjacent too or nearby the user and the system.

At 804, the system may generate a plurality of edgelets from the input images. For example, the system may perform edgelet detection in order to detect the round or curved objects in the input images. As discussed above, an edgelet is a small patch of an image with high image gradient.

At 806, the system may join adjacent edgelets to generate a plurality of joined edgelets. For example, the system may connect nearby (e.g., less than a pixel distance threshold) having or falling along a continuous gradient (e.g. less than a gradient threshold from each other).

At 808, the system may estimate contours based at least in part on the joined edgelets. In some cases, the system 206 may compute a reprojection error for each edgelet in a contour and reject edgelets that have a reprojection error over a threshold.

At 810, the system may determine at least one surface based at least in part on the contours. For instance, the system may apply a Poisson reconstruction technique to the contours in order to determine the surface.

At 812, the system may project the surface into the virtual scene. For example, the system may show rays, corner lines, partially transparent walls, or other indicator of the location and size of the object within the virtual scene. in some cases, the projection may become more visible, flash, or otherwise draw more attention from the user as the user moves closer to the physical object.

Figure 9:
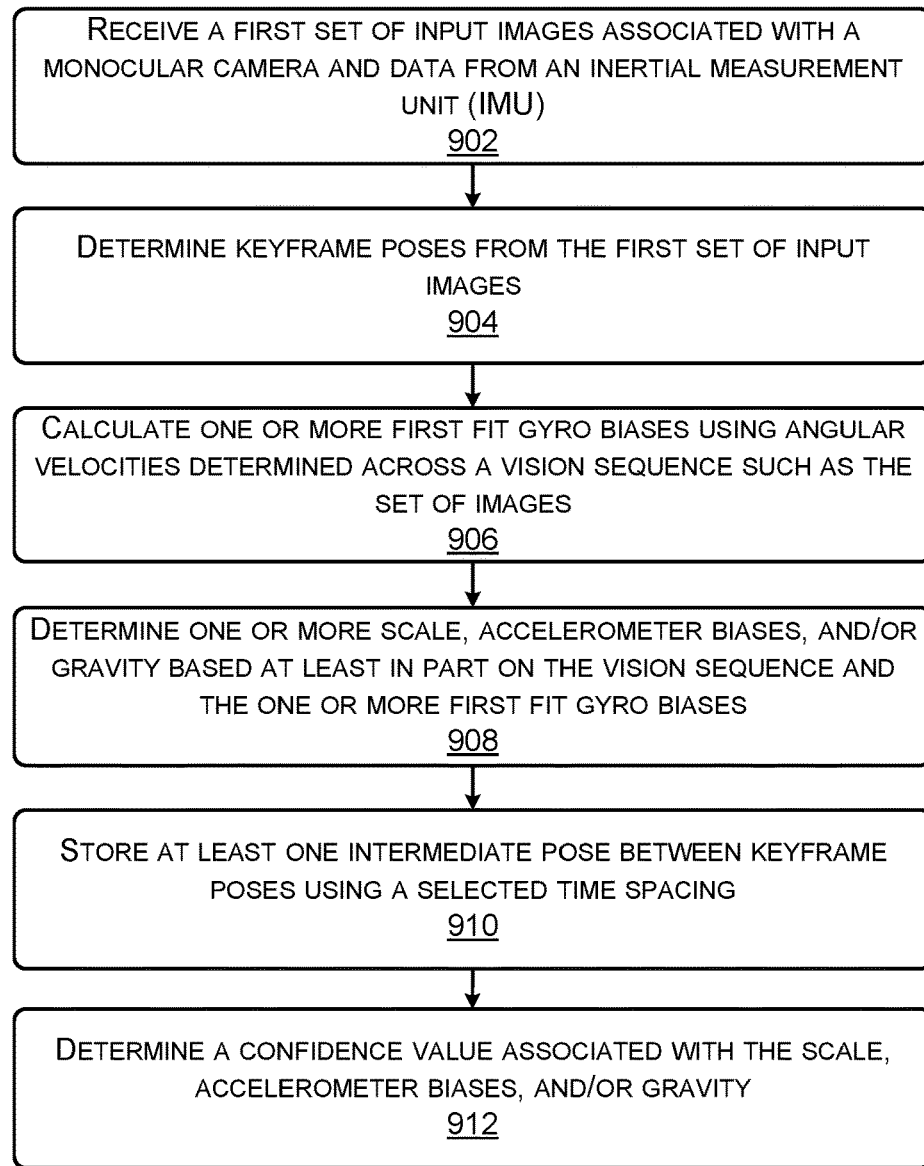
FIG. 9 is an example three-dimensional map of a physical environment formed using lien segments and edgelets according to some implementations.

FIG. 9 illustrates an example flow diagram showing a process 900 for providing scale to a virtual reality scene according to some implementations. As discussed above, in some implementations, the system may also be configured to determine a scale associated with the physical environment to assist with object awareness and avoidance as well as to correctly scale the virtual scene with respect to the user. For instance, while implementing a SLAM technique allows for tracking motion of the user, the motion of the user lacks a scale or relativity with respect to the user's expectations in the real physical world.

At 902, the system may receive a first set of images associated with a monocular camera and IMU data from an IMU. IN some cases, each of the images of the first set of images and the IMU data is timestamped based on the time of collection. In one example, the system may be equipped with the monocular camera and may be used to capture image to map or otherwise scan a physical environment. the system may also be equipped with one or more IMUs to collect the motion or IMU data. In one example, the system may capture the first set of images and the IMU data as the user utilizes the system within the physical environment. For instance, the system may implement a SLAM technique to track a 6DOF pose of the user within the physical environment.

At 904, the system may determine keyframe poses from the first set of input images. In some cases, the keyframe poses may be selected based at least in part on detection of keypoints within at least some of the frames or individual images. In some instances, the keyframe poses may be determined using the SLAM technique.

At 906 the system may calculate one or more one or more first fit gyro biases using angular velocities determined across a vision sequence such as the set of images. For example, the first fit gyro biases may be determined using the time stamped IMU data and the corresponding images of the set of images.

At 908, the system may determine one or more scale, accelerometer biases, and/or gravity based at least in part on the vision sequence and the one or more first fit gyro biases. For example, the system may apply a least squares optimization using the IMU data and the set of images. In these cases, when the system uses a least squares optimization, the system may apply de-noising to reduce issues associated with the regression dilution property of the linear least squares. For instance, in some case, the regression dilution property of the linear least squares may cause the scale to be underestimated when there is noise in the tracked poses/

At 910, the system may store at least one intermediate pose between keyframe poses using a selected time spacing between poses. For example, the system may store an intermediate pose on a periodic basis (such as, every 3 frames, every 5 frames, every eight frames or other number of frames). In some cases, the system may store an intermediate pose based on a time threshold (e.g., an intermediate pose is stored every 5 seconds, 10 seconds, or 15 seconds, amount other thresholds or periods).

At 910, the system may receive a second set of input images. In this case, the second set of input images may be captured by the camera, such as the monocular camera of the system. In some cases, the second set of input images may be associated with a second session or immersion of the virtual reality system by the user.

At 912, the system may determine a confidence value of the scale, accelerometer biases, and/or gravity. For example, the system may in some cases optionally, apply an optimization by performing 904 multiple times by perturbing the tracked poses. For instance, the system may apply a Gaussian-like noise to the tracked poses based on an idea of what the noise should look like and then determine a standard deviation of the scale, accelerometer biases, and/or gravity. The standard deviation may then be used to determine the confidence value associated with the estimated scale, accelerometer biases, and/or gravity.

Figure 10:
FIG. 10 is an example three-dimensional model including lines and surfaces of detected physical objects according to some implementations.

FIG. 10 is an example three-dimensional model 1000 including lines and surfaces of detected physical objects according to some implementations. For example, the lines and surfaces may be detected and formed as discussed above with respect to FIGS. 1-9. For example, the system may perform lien segment or edgelet detection using gradients to form the lines and surfaces shown. In some cases, the lines and surfaces shown may be projected into the virtual scene to make the user aware of the physical environment.

Figure 11:
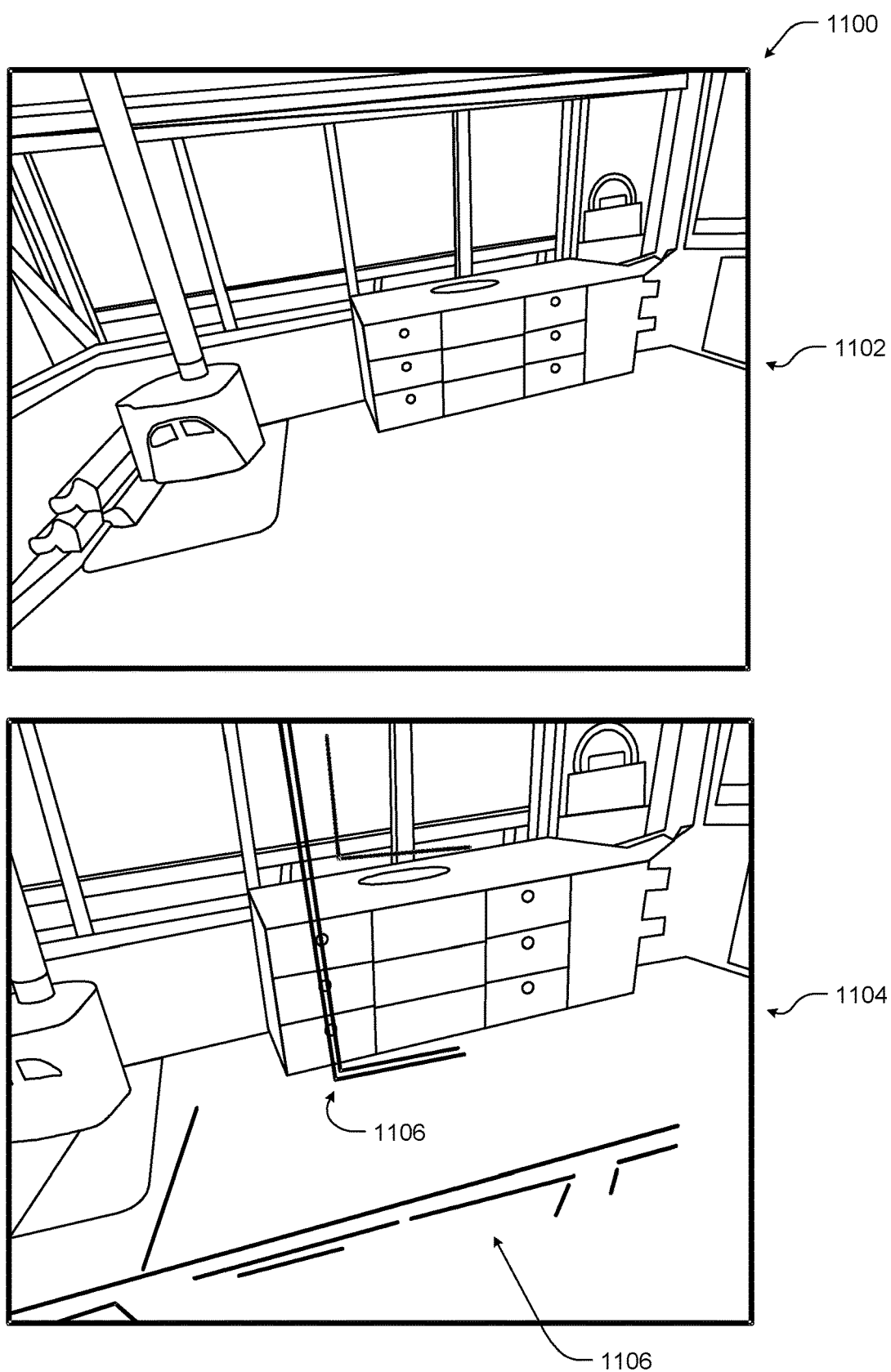
FIG. 11 is an example virtual scene including projected line segments of physical objects according to some implementations.

FIG. 11 is an example 1100 of a virtual scene 1102 and 1104 including projected line segments 1106 of physical objects according to some implementations. In this example, the user may be viewing the virtual scene 1102 including the wood burning stove and dresser. However, an object such as a table may be nearby the user's leg. In this example, the system has projected lines 1106 into the virtual scene 1104 such that the user is able to become aware of the table and thereby avoid a collision.

Figure 12:
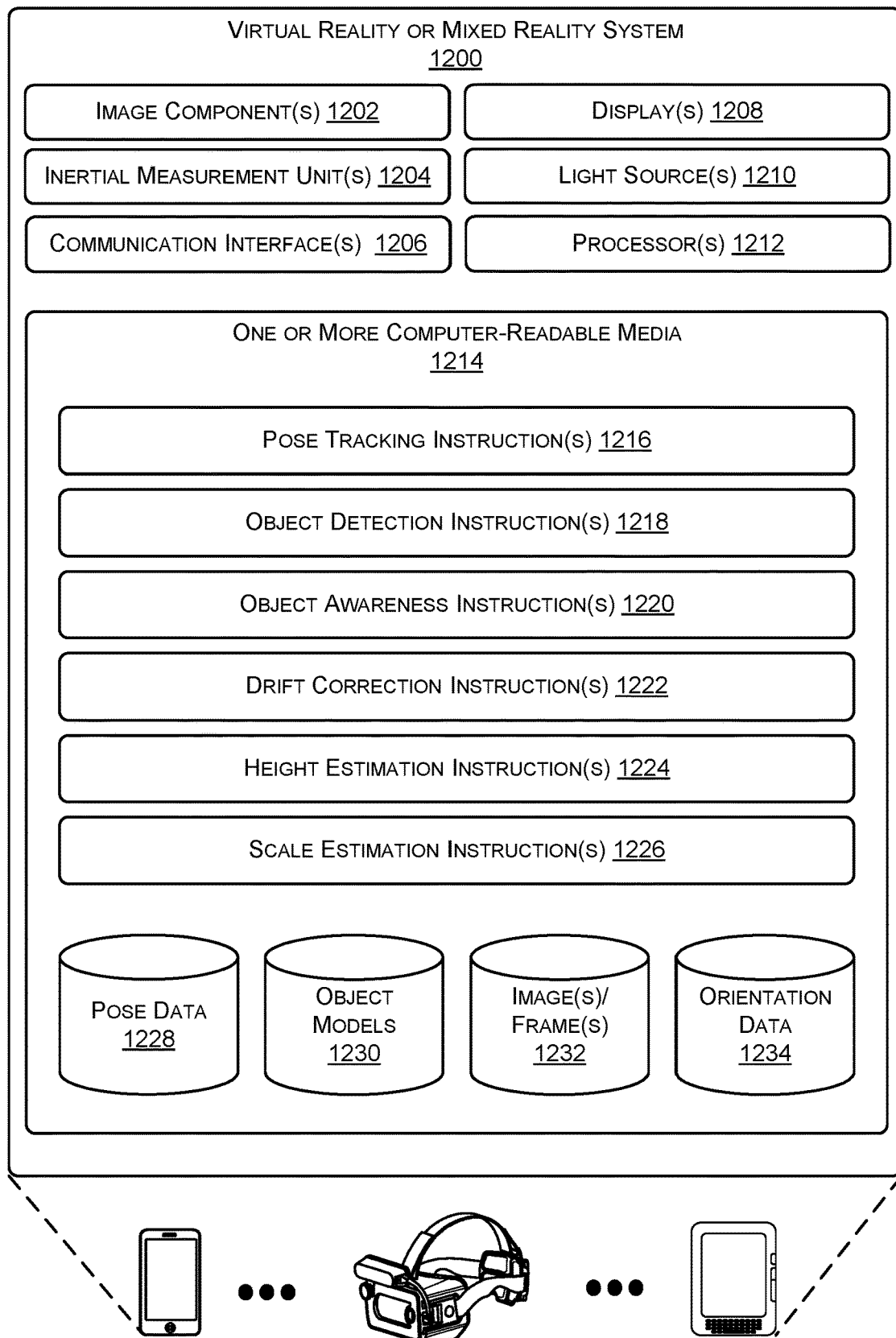
FIG. 12 is an example image system according to some implementations.

FIG. 12 is an example virtual reality or mixed reality system 1200 according to some implementations. As described above, the system 1200 may be a headset device, portable electronic device, or a combination thereof. For example, the system 1200 may include a headset device that is configured to physical and/or communicatively couple to a portable electronic 600. In some cases, the system 1200 may be a self-contained. In general, the system 1200 may be configured to implement one or more of the processes discussed above with respect to FIGS. 1-9. In some cases, the system 1200 may utilized multiple process discussed above with respect to FIGS. 1-9 in combination to track a user's 6DOF pose, detect physical objects, and/or make the user aware of the physical objects.

In the current example, the system 1200 may include image components 1202 for capturing visual data, such as images or frames, from a physical environment. For example, the image components 1202 may be positioned to capture multiple image from substantially the same perspective as the user (e.g., a position proximate the user's eyes or head) in order to incorporate the image data associated with the captured image into the virtual scene and/or to identify physical objects and assist in avoiding collisions. The image components 1202 may be of various sizes and quality, for instance, the image components 1202 may include one or more wide screen cameras, 3D cameras, high definition cameras, video cameras, monocular cameras, among other types of cameras. In general, the image components 1202 may each include various components and/or attributes.

In some cases, the system 1200 may include one or more IMUs 1204 to determine the orientation data (e.g., IMU data) such as, acceleration, angular momentum, pitch, roll, yaw, associated with the motion of the user or the system 1200. For instance, the measurement units 1204 may include one or more accelerometers, one or more gyroscopes, one or more magnetometers, and/or one or more pressure sensors, as well as other sensors. In one particular example, the measurement units 1204 may include three accelerometers placed orthogonal to each other, three rate gyroscopes placed orthogonal to each other, three magnetometers placed orthogonal to each other, and a barometric pressure sensor.

The system 1200 may also include one or more communication interfaces 1206 configured to facilitate communication between one or more networks, one or more cloud-based management system, and/or one or more physical objects, such as controller or hand-held component associated with the mixed or virtual reality system 1200. The communication interfaces 1206 may also facilitate communication between one or more wireless access points, a master device, and/or one or more other computing devices as part of an ad-hoc or home network system. The communication interfaces 1206 may support both wired and wireless connection to various networks, such as cellular networks, radio, WiFi networks, short-range or near-field networks (e.g., Bluetooth®), infrared signals, local area networks, wide area networks, the Internet, and so forth.

In the illustrated example, the system 1200 also includes a display 1208, such as a 3D environment display or a traditional 2D display. For instance, in one example, the display 1208 may include a flat display surface, such as a touch screen or LED display, combined with optical lenses configured to allow a user of the system 1200 to view the display 1200 in 3D.

The image system 1200 may also include one or more light sources 1210. In some cases, the light sources 1210 may be configured to assist with object, physical environment mapping, and/or user tracking. For example, the light sources 1210 may project lines, patterns, or indicators onto objects, such that the system 1200 may map surfaces by analyzing image data including the indicators present on the surfaces.

The system 1200 may also include one or more processors 1212, such as at least one or more access components, control logic circuits, central processing units, or processors, as well as one or more computer-readable media 1214 to perform the function associated with the virtual environment. Additionally, each of the processors 1212 may itself comprise one or more processors or processing cores.

Depending on the configuration, the computer-readable media 1214 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1212.

Several modules such as instruction, data stores, and so forth may be stored within the computer-readable media 1214 and configured to execute on the processors 1212. For example, as illustrated, the computer-readable media 1214 store pose tracking instructions 1216, object detection instructions 1218, object awareness instructions 1220, drift correction instructions 1222, height estimation instructions 1224, and scale estimation instructions 1226 as well as pose data 1228, object models 1230, image/frames 1232, and orientation or IMU data 1234.

The pose data 1228 may include 6DOF pose data of the user and/or objects within the physical environment such that the system 1200 may track the 6DOF pose of the user as the user moves within the physical environment and virtual scene. The object models 1230 may be 3D models of objects, surfaces, and/or contours within a physical environment that have been mapped or are known. In some cases, the object models 1230 may be generated from image data from the corresponding physical environment while in other cases, the object models 1230 may be generated using data aggregated from a plurality of physical environments (e.g., such as common shapes or objects). The image/frames 1232 may be image data or frames captured by the image component 1202. The orientation or IMU data 1234 may be data collected by the IMU 1204 of the system 1200 and/or IMU data 1234 collected by nearby devices (e.g., a handheld remote control associated with the system 1200).

The pose tracking instructions 1216 may be configured to receive the images and/or frames 1232 captured by the image component 1202 to track the 6DOF pose of the user within the physical environment. For instance, the pose tracking instructions 1216 may perform a visual-inertial SLAM technique to track the 6DOF pose of the user.

The object detection instructions 1218 may be configured to identify objects or lines associated with objects within the physical environment surrounding the user. For example, the object detection instructions 1218 may generate a sparse map of points of interest using feature points. The points of interest may then be used as inputs to the SLAM associated with the pose tracking instructions 1216. The object detection instructions 1218 includes an obstacle-awareness process to detect line segments from the images and frames 1232 captured by the image components 1202. The object detection instructions 1218 matches the line segments together using one or more descriptor to form lines. As discussed above, the descriptor may be a color variations, gradients, or contrasts between each side of the lines, as lines within a physical environment typically have a dominate color on each side.

Next, the object detection instructions 1218 locates the lines in the physical environment by using pairs of images or frames 1230 captured by the image components 1202 and the 6DOF pose generated by the pose tracking instructions 1216. For example, the object detection instructions 1218 may be parameterized each line using the two 3D points which represent the line's endpoints. For example, the object detection instructions 1218 place or locate each line as the lien is observed in multiple images.

In another example, the object detection instructions 1218 may detect edgelets in addition to or in lieu of detecting lines. As discussed herein, an edgelet is a small patch of an image with high image gradient. For example, detecting edgelets allows for the detection of curved surfaces or contours in addition to those having straight edges. In this example, the object detection instructions 1218 may use the sparse point of interest map and the 6DOF pose generated by the pose tracking instructions 1216. The object detection instructions 1218 may first detect then merge or connect nearby or adjacent edgelets together. In some cases, the object detection instructions 1218 may compute a reprojection error for each edgelet in a contour and reject edgelets that have a reprojection error over a threshold. The joined or connected edgelets are then utilized by the object detection instructions 1218 to estimate surface contours. The surface contours may be used to form surfaces, for instance, by applying a Poisson reconstruction technique.

The object awareness instructions 1220 may be configured to project the lines, surfaces, and/or contours detected by the object detection instructions 1218 into the virtual scene. For example, the object awareness instructions 1220 may cause rays, corner lines, partially transparent walls, or other indicator of the location and size of the object to be displayed to the user within the virtual scene.

The drift correction instructions 1222 may be configured to perform a periodic bundle adjustment or correction to align the user within the virtual scene with the user's actual location in the physical environment. The drift correction instructions 1222 may perform the bundle adjustment to determine a desired 6DOF pose of the user. Next, the drift correction instructions 1222 may then determine a transformation estimate between the desired 6DOF pose and the current 6DOF pose of the user to generate a difference in each of the six degrees of freedom. In some cases, the transformation estimate may include a translation estimate and a rotation estimate. Once the transformation estimate is calculated, when the user moves, the drift correction instructions 1222 may determine a direction of the motion along each of the six degrees of freedom, e.g., the motion in the X direction (left/right), Y direction (up/down), Z direction (forward/backward), as well as the pitch, yaw, and roll of the motion.

If the motion of the user within one of the six degrees of freedom matches one of the six degree of freedom associated with the transformation estimate, the drift correction instructions 1222 may cause an increase or decrease in magnitude or speed associated with the movement along the corresponding degree of freedom.

In another example, the drift correction instructions 1222 may determine a correction vector based on difference between the current 6DOF pose of the user and the desired 6DOF pose. While the user is in motion, the drift correction instructions 1222 may determine an overall magnitude associated with the motion regardless of the degree of freedom. The drift correction instructions 1222 may then calculate a correction motion and apply the correction motion in the direction of the correction vector.

The height estimation instructions 1224 may be configured to establish a height of the user engaged in the virtual scene. The height estimation instructions 1224 may first determine surfaces or planes using one more of the processes discussed above. For example, the height estimation instructions 1224 may utilize gravity data available from the IMU data 1234 as potential or hypothesis ground planes. The height estimation instructions 1224 may then process each of the potential or hypothesis ground planes to determine which is beneath the 6DOF pose of the user. Alternatively, the height estimation instructions 1224 may label each surface as a potential or hypothesis ground planes if the surface is perpendicular to gravity determined form the IMU data 1234. The system may then preform a 1D search for the true ground plane.

The scale estimation instructions 1226 may be configured to determine a scale associated with the physical environment to assist with object awareness and avoidance as well as to correctly scale the virtual scene with respect to the user. In one example, the scale estimation instructions 1226 may first select and store a number of keyframe poses that may be used to determine scale from the plurality of frames received as part of the images and frames 1232 captured by the image components 1202. For example, a keyframe pose may be selected based in part on the detection of keypoints within a particular frame. In this example, the scale estimation instructions 1226 may also select and store a number of intermediate poses to provide additional 6DOF poses between keyframe poses. In some cases, the intermediate poses may be captured and stored by the scale estimation instructions 1226 on a periodic basis. The scale estimation instructions 1226 may then remove noise from the keyframe poses and the intermediate posers using a Monet Carlo technique to estimate uncertainty and solve for various parameters.

The scale estimation instructions 1226 may then receive additional images or frames 1232. Each additional frame may have corresponding IMU data 1234 collected by an IMU 124 proximate to the image components 1202 of the system 1200. The scale estimation instructions 1226 may then determine scale by solving a linear system of equations using two or more of the keyframe poses and/or the intermediate poses, the acceleration data collected as part of the IMU data 1234, and the additional images/frames 1232.

FIG. 13 is an example pseudocode 1300 associated with determining an adjusting a pose of a user within a virtual scene according to some implementations. For instance, in the current example, the pseudocode 1300 may cause the system to determine the current 6DOF pose of the user has shifted or drifted with respect to a physical position of the user. In these cases, the pseudocode 1300 may cause the system to determine a desired 6DOF pose of the user as part of a bundle adjustment. The system may then determine a transformation estimate between the desired 6DOF pose and the current 6DOF pose of the user to generate a difference in each of the six degrees of freedom. In some cases, the transformation estimate may include a translation estimate and a rotation estimate. the pseudocode 1300 may cause the system to speed up or slow down a movement of the user along a corresponding degree of freedom to gradually move the user into the desired 6DOF pose FIG. 14 is another example pseudocode 1400 associated with determining an adjusting a pose of a user within a virtual scene according to some implementations. In this example, the pseudocode 1400 may cause the system may correct for accumulated drift in smaller segments but without regard to the degree of the user motions. For instance, the pseudocode 1400 may cause the system may then determine a correction vector based on difference between the current 6DOF pose of the user and the desired 6DOF pose. While the user is in motion, the system may determine an overall magnitude associated with the motion. The pseudocode 1400 may cause the system may then calculate a correction motion that is no more than 5% of the magnitude of the user's current motion and apply the correction motion in the direction of the correction vector to the user's motion while the user is moving.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
presenting, on a display of a virtual reality or mixed reality system, a virtual scene to a user;
detecting an edge of a physical object within a physical environment from one or more images captured by the virtual reality or mixed reality system, the physical object not displayed as part of the virtual scene;
determining a six degree of freedom pose associated with the user;
determining the user is within a threshold distance from the physical object; and
displaying, in response to the user being within the threshold distance from the physical object, the edge of the physical object within the virtual scene being presented to the user.

2. The method as recited in claim 1, wherein detecting the edge of the physical object includes:
detecting a first line segment based on a first color gradient within the one or more images;
detecting a second line segment based on a second color gradient within the one or more images;
merging the first line segment to the second line segment into the edge based at least in part on a similarly of the first color gradient to the second color gradient; and
locating the edge within a three-dimensional model of the physical environment.

3. The method as recited in claim 2, wherein detecting the edge of the physical object further comprises adjusting location of the edge within the three-dimensional model.

4. The method as recited in claim 1, wherein detecting the edge of the physical object includes:
detecting a first edgelet from the one or more images;
detecting a second edgelet from the one or more images;
detecting a continuous gradient between the first edgelet and the second edgelet;
joining the first edgelet with the second edgelet into a joined edgelet based at least in part on the continues gradient;
estimating a contour based at least in part on the joined edgelet; and
determining a surface based at least in part on the contour; and
wherein the edge is an edge of the surface.

5. The method as recited in claim 1, wherein the one or more images are captured by a monocular camera.

6. The method as recited in claim 1, further comprising:
determining a direction of movement associated with the user based at least in part on inertial measurement unit data collected by an inertial measurement unit of the virtual reality or mixed reality system;

determining a collision risk between the user and the physical object based at least in part on the direction of movement of the user, the six degree of freedom pose of the user, and a location of the edge; and wherein displaying the edge of the physical object within the virtual scene is based at least in part on the collision risk being greater than a threshold.

7. The method as recited in claim 1, wherein displaying the edge of the physical object within a virtual scene includes:
   determining a field of view of the user based at least in part on the six degree of freedom pose of the user;
   determining the edge is not within the field of view; and
   displaying an indicator of the edge within a field of view of the user.

8. The method as recited in claim 7, wherein the indicator is at least one of a ray projecting from the edge or the edge into a field of view of the user.

9. A system comprising:
   an image capture device, for capturing image data associated with a physical environment surrounding the system;
   at least one display device for presenting a virtual scene to a user of the system;
   one or more processors; and
   one or more non-transitory computer-readable media storing computer-executable instructions, which when executed by the one or more processors cause the one or more processors to perform operations comprising:
      detecting, based at least in part on the image data, an edge of a physical object within the physical environment, the physical object excluded from the virtual scene;
      determining a six degree of freedom pose associated with the user of the system;
      determining the user is within a threshold distance from the physical object; and
      displaying, in response to the user is within the threshold distance from the physical object, the edge of the physical object within the virtual scene being presented to the user.

10. The system as recited in claim 9, wherein detecting the edge of the physical object includes:
    detecting a first line segment based on a first color gradient within the image data;
    detecting a second line segment based on a second color gradient within the image data;
    merging the first line segment to the second line segment into the edge based at least in part on a similarly of the first color gradient to the second color gradient; and
    locating the edge within a three-dimensional model of the physical environment.

11. The system as recited in claim 10, wherein detecting the edge of the physical object further comprises adjusting location of the edge within the three-dimensional model.

12. The system as recited in claim 9, wherein detecting the edge of the physical object includes:
    detecting a first edgelet based at least in part on the image data;
    detecting a second edgelet based at least in part on the image data;
    detecting a continuous gradient between the first edgelet and the second edgelet;
    joining the first edgelet with the second edgelet into a joined edgelet based at least in part on the continues gradient;
    estimating a contour based at least in part on the joined edgelet; and
    determining a surface based at least in part on the contour; and
    wherein the edge is an edge of the surface.

13. The system as recited in claim 9, further comprising:
    an inertial measurement unit to capture orientation data associated with the system; and
    wherein the operation further comprise:
       determining a direction of movement associated with the user based at least in part on orientation data collected;
       determining a collision risk between the user and the physical object based at least in part on the direction of movement of the user, the six degree of freedom pose of the user, and a location of the edge; and
       wherein displaying the edge of the physical object within the virtual scene is based at least in part on the collision risk being greater than a threshold.

14. The method as recited in claim 9, wherein displaying the edge of the physical object within the virtual scene includes:
    determining a field of view of the user based at least in part on the six degree of freedom pose of the user;
    determining the edge is not within the field of view; and
    displaying an indicator of the edge within a field of view of the user.

15. The method as recited in claim 14, wherein the indicator is at least one of a ray projecting from the edge or the edge into a field of view of the user.

16. One or more non-transitory computer-readable media storing computer-executable instructions, which when executed by one or more processors cause the one or more processors to perform operations comprising:
    presenting, via a display device, a virtual scene;
    detecting, based at least in part on image data received from an image device, an edge of a physical object within the physical environment, the physical object not presented as part of the virtual scene;
    determining a six degree of freedom pose associated with the user;
    determining the user is within a threshold distance from the physical object; and
    causing, in response to the user is within the threshold distance from the physical object, the display device to present the edge of the physical object within the virtual scene.

17. The non-transitory computer-readable media as recited in claim 16, wherein detecting the edge of the physical object includes:
    detecting a first line segment based on a first color gradient within the image data;
    detecting a second line segment based on a second color gradient within the image data;
    merging the first line segment to the second line segment into the edge based at least in part on a similarly of the first color gradient to the second color gradient; and
    locating the edge within a three-dimensional model of the physical environment.

18. The non-transitory computer-readable media as recited in claim 16, wherein detecting the edge of the physical object includes:
    detecting a first edgelet based at least in part on the image data;
    detecting a second edgelet based at least in part on the image data;

detecting a continuous gradient between the first edgelet and the second edgelet;
joining the first edgelet with the second edgelet into a joined edgelet based at least in part on the continues gradient;
estimating a contour based at least in part on the joined edgelet; and
determining a surface based at least in part on the contour; and
wherein the edge is an edge of the surface.

19. The non-transitory computer-readable media as recited in claim 16, wherein the operation further comprise:
an inertial measurement unit data associated with the user;
determining a direction of movement associated with the user based at least in part on orientation data collected;
determining a collision risk between the user and the physical object based at least in part on the direction of movement of the user, the six degree of freedom pose of the user, and a location of the edge; and
wherein displaying the edge of the physical object within the virtual scene is based at least in part on the collision risk being greater than a threshold.

20. The non-transitory computer-readable media as recited in claim 16, wherein causing the display device to present the edge of the physical object within the virtual scene includes:
determining a field of view of the user based at least in part on the six degree of freedom pose of the user;
determining the edge is not within the field of view; and
displaying an indicator of the edge within a field of view of the user.

* * * * *